US009631483B2

(12) United States Patent
Donderici et al.

(10) Patent No.: US 9,631,483 B2
(45) Date of Patent: Apr. 25, 2017

(54) JOINT TIME-FREQUENCY PROCESSING FOR BOREHOLE ACOUSTIC ARRAYS

(75) Inventors: Burkay Donderici, Houston, TX (US); Arthur Cheng, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 72 days.

(21) Appl. No.: 14/413,901

(22) PCT Filed: Jul. 12, 2012

(86) PCT No.: PCT/US2012/046494
§ 371 (c)(1),
(2), (4) Date: Jan. 9, 2015

(87) PCT Pub. No.: WO2014/011180
PCT Pub. Date: Jan. 16, 2014

(65) Prior Publication Data
US 2015/0137987 A1 May 21, 2015

(51) Int. Cl.
*G01V 3/00* (2006.01)
*E21B 47/12* (2012.01)
*G01V 1/48* (2006.01)

(52) U.S. Cl.
CPC ............... *E21B 47/12* (2013.01); *G01V 1/48* (2013.01)

(58) Field of Classification Search
CPC ........ E21B 47/101; E21B 47/12; E21B 47/14; E21B 47/16; G01N 2291/269; G01N 29/04; G01V 1/48
USPC ....................................... 340/856.4
See application file for complete search history.

(56) References Cited

U.S. PATENT DOCUMENTS

| 5,831,934 | A | 11/1998 | Gill et al. |
| 6,453,240 | B1 * | 9/2002 | Blanch ................... G01V 1/48 |
| | | | 702/11 |
| 6,691,036 | B2 | 2/2004 | Blanch et al. |
| 7,089,119 | B2 | 8/2006 | Mandal |
| 7,099,810 | B2 | 8/2006 | Mandal |
| 7,649,805 | B2 | 1/2010 | Bose et al. |
| 7,660,196 | B2 | 2/2010 | Saiki et al. |
| 2003/0139884 | A1 | 7/2003 | Blanch et al. |

(Continued)

FOREIGN PATENT DOCUMENTS

WO  WO-0062101 A1  10/2000

OTHER PUBLICATIONS

PCT/US2012/046494 International Preliminary Report on Patentability, Chapter 11 of the Patent Cooperation Treaty, Dec. 11, 2014.*

(Continued)

*Primary Examiner* — Nader Bolourchi
(74) *Attorney, Agent, or Firm* — Gilliam IP PLLC

(57) ABSTRACT

Various embodiments include apparatus and methods to process acoustic signals according to joint time-frequency processing. The joint time-frequency processing can combine features of both time-based processing and frequency-based processing. This processing may be based on delay calculation from amplitude phases generated from the acoustic signals. The joint time-frequency processing may be applied to a variety of applications to evaluate properties associated with a borehole or surrounding formations. Additional apparatus, systems, and methods are disclosed.

25 Claims, 16 Drawing Sheets

(56) References Cited

U.S. PATENT DOCUMENTS

2009/0067286 A1  3/2009 Bose et al.
2015/0338378 A1* 11/2015 Lu .......................... G01N 29/04
                                                   73/632

OTHER PUBLICATIONS

"Australian Application Serial No. 2012384919, Examination Report mailed Feb. 3, 2016", 2 pgs.
"European Application Serial No. 12741426.6, Office Action mailed Feb. 25, 2015", 2 pgs.
"European Application Serial No. 12741426.6, Response filed Aug. 19, 2015 to Office Action mailed Feb. 25, 2015", 15 pgs.
"International Application Serial No. PCT/US2012/046494, International Preliminary Report on Patentability mailed Dec. 11, 2014", 6 pgs.
"International Application Serial No. PCT/US2012/046494, International Search Report mailed Apr. 26, 2013", 4 pgs.
"International Application Serial No. PCT/US2012/046494, Response filed May 12, 2014 to Written Opinion mailed Apr. 26, 2013", 3 pgs.
"International Application Serial No. PCT/US2012/046494, Written Opinion mailed Apr. 26, 2013", 3 pgs.
"International Application Serial No. PCT/US2012/046494, Written Opinion mailed Aug. 15, 2014", 5 pgs.
Kimball, Christopher V, "Shear Slowness Measurement by Dispersive Processing of the Borehole Flexural Mode", Geophysics, vol. 63, No. 2, (Mar.-Apr. 1998), 337-344.
Tang, X.-M., et al., "In: vol. 24—Quantitative Borehore Acoustic Methods", Handbook of Geophysical Exploration: Seismic Exploration. Elsevier Ltd., (2004), 159-167.

* cited by examiner

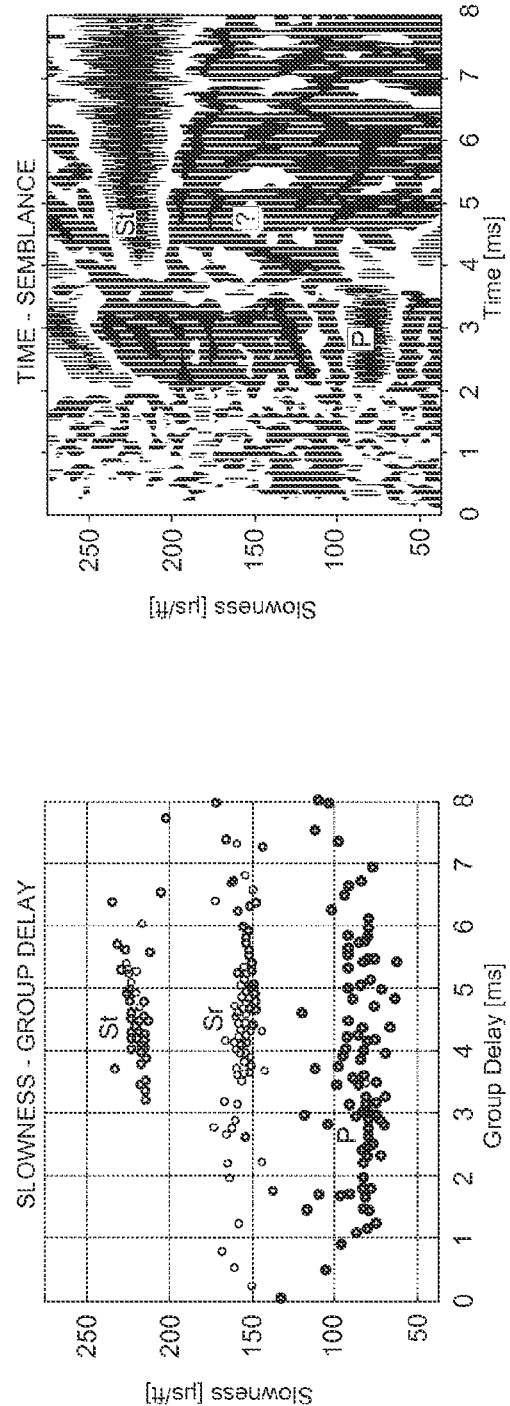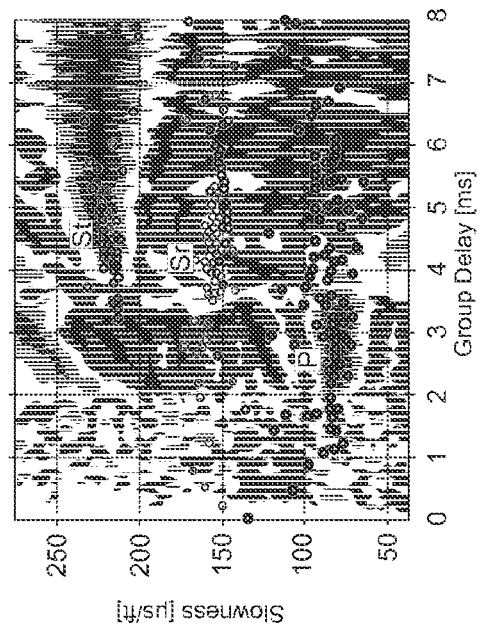
Fig. 11A
Fig. 11B
Fig. 11C

JOINT TIME-FREQUENCY PROCESSING FOR BOREHOLE ACOUSTIC ARRAYS

PRIORITY APPLICATIONS

This application is a U.S. National Stage Filing under 35 U.S.C. 371 from International Application No. PCT/US2012/046494, filed on 12 Jul. 2012, and published as WO 2014/011180 A1 on 16 Jan. 2014; which application and publication are incorporated herein by reference in their entirety.

TECHNICAL FIELD

The present invention relates generally to apparatus and methods for making measurements related to oil and gas exploration.

BACKGROUND

In drilling wells for oil and gas exploration, understanding the structure and properties of the associated geological formation provides information to aid such exploration. Measurements in a borehole are typically performed to attain this understanding, where the measurements can include using acoustic signals. In processing of borehole acoustic signals, two main types of algorithms are employed: time-domain procedures and frequency-domain procedures. Time-domain procedures do not require a transformation and they are computationally efficient. Time-domain procedures also allow application of fans based on arrival times of signals. Fans are filters that can operate on data based on a model of what data should and what data should not appear. Fans can be used to reject noise and acquire data. Fans can be particularly useful to eliminate unwanted modes.

However, time-domain procedures suffer from interference of different frequencies, which may constructively or destructively interact. Furthermore, time-domain procedures are mostly influenced by the dominant frequency of the signal, which may produce slownesses that are higher or lower than the actual formation slowness due to dispersive behavior of signals. Slowness, which is proportional to the inverse of velocity, is the amount of time for a wave to travel a certain distance. Even though manual application of digital filters partially solves this problem, such application may be a tedious process that requires manual work by an experienced log analyst. Frequency-domain procedures, on the other hand, can produce dispersion curves, which can be directly interpreted to recover the actual formation slowness. Frequency-domain procedures do not operate with time-based information, such as the time-slowness fans based on arrival times. Partly because an easy method to clean the signal is not available with frequency processing, frequency-domain procedures are usually only utilized for quality control. Further, the usefulness of such traditional measurements may be related to the precision or quality of the information derived from such measurements.

BRIEF DESCRIPTION OF THE DRAWINGS

FIGS. 11A-C show a delay-slowness plot, a time semblance plot, and an overlay of these plots for monopole excitation, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Two popular analysis tools for borehole acoustic arrays are time-semblance and frequency-semblance (coherence) algorithms. When a time-semblance algorithm is used, frequency information becomes difficult to extract and often ignored. When frequency-semblance algorithm is used, time information is typically ignored. Analysts often need to apply both analyses separately, where they can have advantages of the first or the second, but not both simultaneously.

In various embodiments, joint time-frequency processing can be applied to acoustic signals to evaluate properties associated a borehole. This processing can be based on a delay calculation from mode amplitude phases or a delay calculation from an amplitude phase from using phase coherence. The joint time-frequency processing can combine features of both time-based processing and frequency-based processing. The joint time-frequency processing may produce interference-free dispersion curves as a function of frequency and time, while a time-slowness fan can be applied to these dispersion curves.

Figure 1:
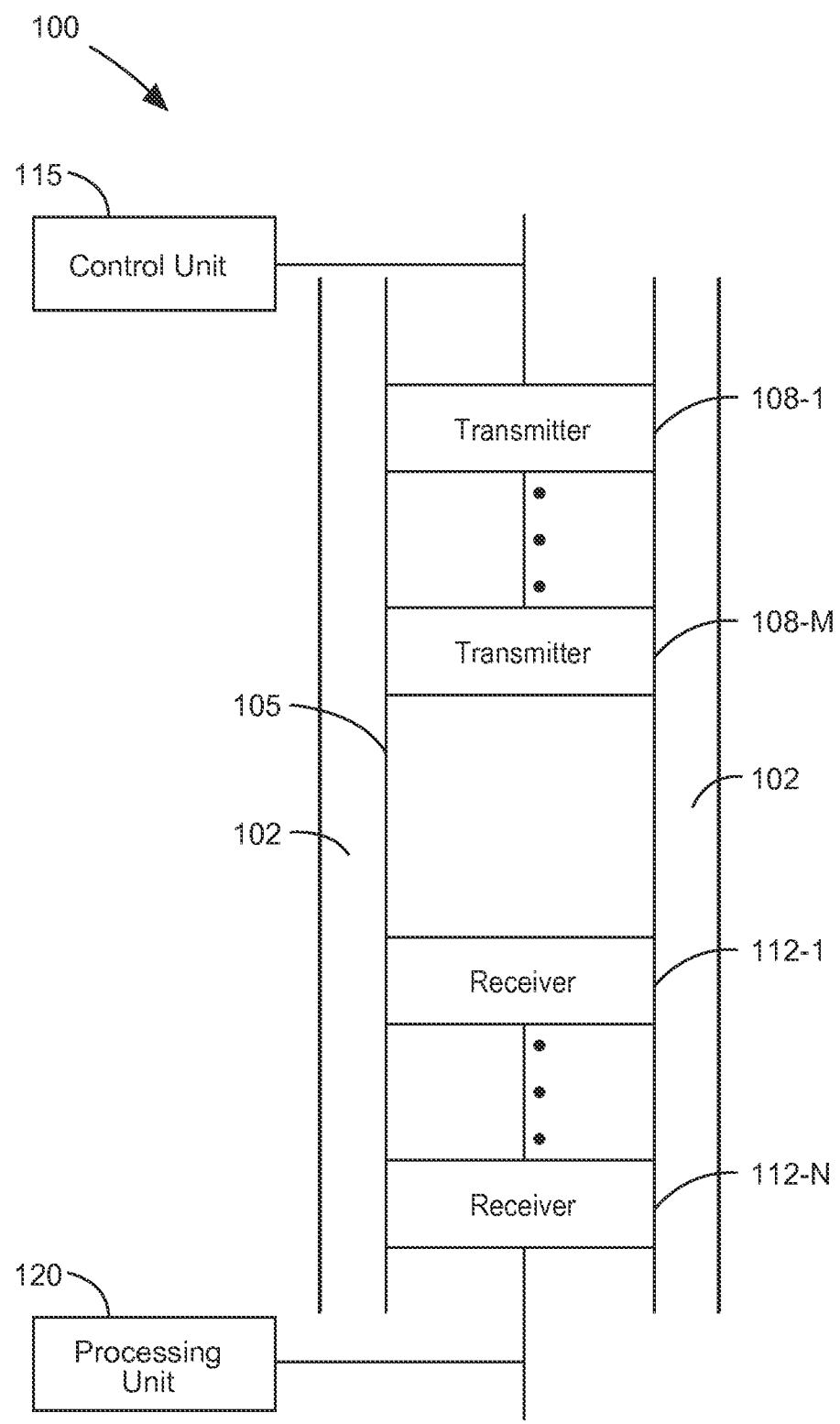
FIG. 1 shows a block diagram of an example apparatus to make and analyze acoustic measurements in a borehole, according to various embodiments.

FIG. 1 shows a block diagram of an embodiment of an example apparatus 100 operable to make acoustic measurements in a borehole 102 and to analyze the measured signals. Apparatus 100 can include an acoustic tool 105 to generate acoustic signals and receive pressure waves from the environment in the vicinity of the acoustic tool 105 in response to the generation of the acoustic signals. Tool 105 can include transmitters 108-1 . . . 108-M and receivers 112-1 . . . 112-N.

Apparatus 100 can include a control unit 115 that manages the generation of transmission signals and the collection of received signals corresponding to the transmitted signals. The generation of the transmitted signals can be conducted to provide signals of different frequencies. The collected received signals can be provided to a processing unit 120 in appropriate format to perform joint time-frequency processing of the acoustic signals on data generated from signals acquired at receivers 112-1 . . . 112-N. The joint time-frequency processing of the received acoustic signals can implement delay calculation from amplitude phase representations of the received acoustic signals. Processing unit 120 can be structured to be operable to provide data or structured representations to evaluate borehole properties. Processing unit 120 can be arranged as a separate unit from control unit 115 or integrated with control unit 115.

Figure 2A:
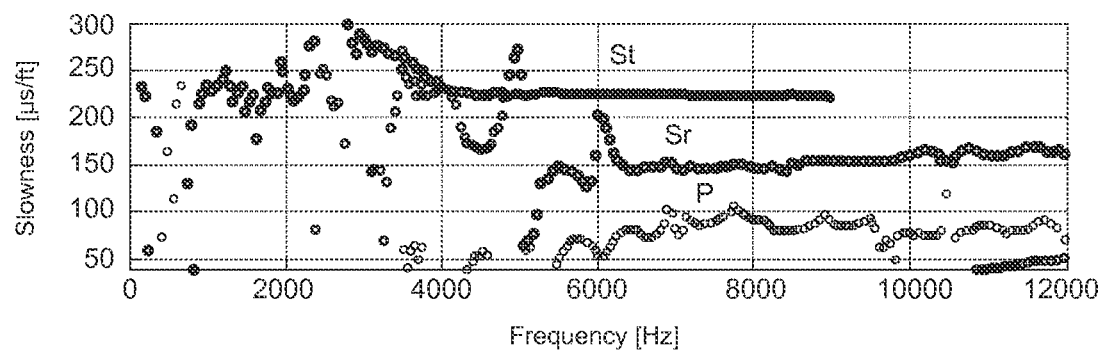
FIGS. 2A-2C provide for comparison of frequency processing and time processing with respect to delay processing of an example joint time-frequency processing method, according to various embodiments.
Figure 2B:
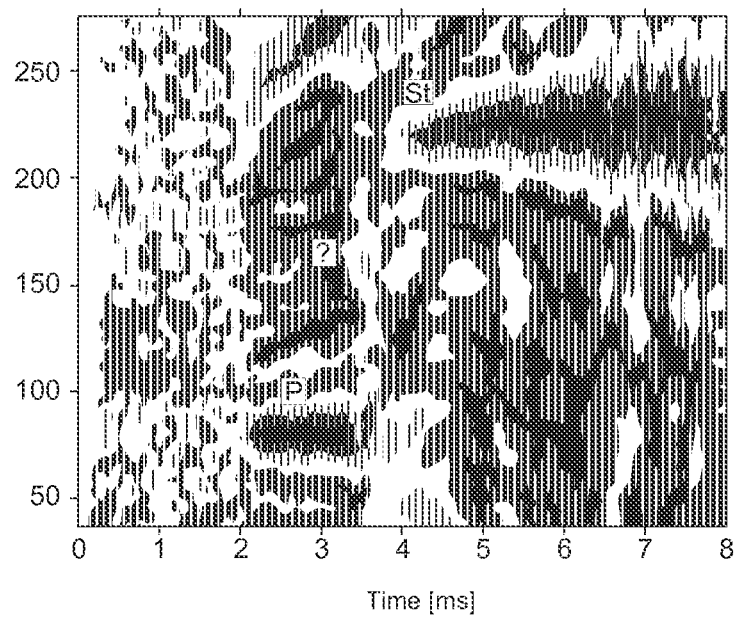
Figure 2C:
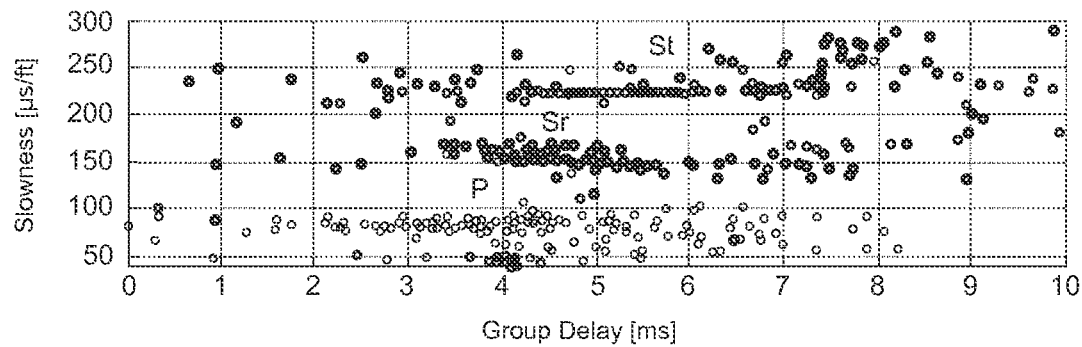

FIGS. 2A-2C provide for comparison of frequency processing (FIG. 2A) and time processing (FIG. 2B) with respect to delay processing (FIG. 2C) of a joint time-frequency processing method. When an acoustic wave in the borehole meets the borehole wall, new waves are generated, which include a reflected wave back into the borehole, a compressional wave (P wave) refracted into the formation, and a shear wave (Sr) refracted into the formation. In addition, a surface wave, known as a Stoneley (St) wave, propagates along the borehole wall that is an interface between the fluid-filled borehole and the solid formation. It can be seen that refracted shear, Sr, that is lost due to interference with the Stoneley mode, St, in time-processing is clearly visible with the delay processing.

It is noted that there is a one to one mapping between each point in FIG. 2A and FIG. 2C. In other words, each point is associated with a frequency, a slowness, and a time value. This relationship not only allows use of the standard frequency-slowness and time-slowness based processing, but also time-frequency and full three dimensional (3D) time-frequency-slowness based processing similar to or identical to embodiments of joint time-frequency processing discussed herein. Such joint time-frequency processing can allow joint time-frequency-slowness analysis and processing of borehole acoustic signals, can allow application of time-based fans on frequency domain dispersion curves, and can allow model-based time-of-arrival estimates that include full-physics analysis such as propagation delays through mud. It can also provide for generation of time-slowness curves that are not affected by frequency interference, and can also provide for generation of 3D fans that can more effectively eliminate noise and unwanted modes. The joint time-frequency processing may provide a basis for improving manual and algorithmic processing and quality control of acoustic signals. The joint time-frequency processing can be implemented using frequency semblance or with phase coherence. Phase coherence may provide a more computationally efficient processing alternative to frequency semblance.

Figure 3:
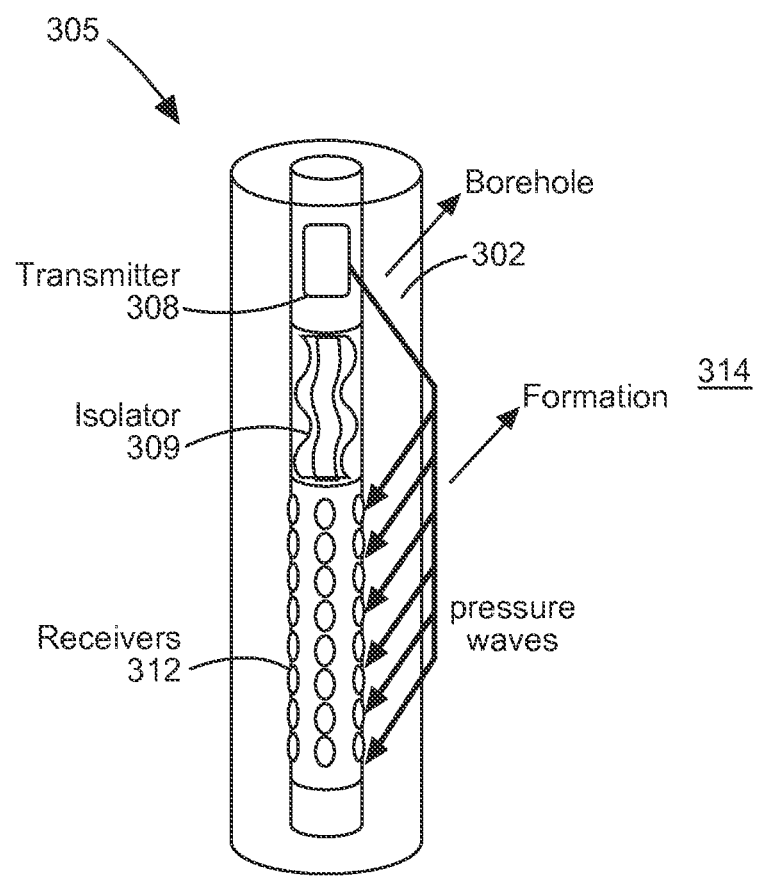
FIG. 3 shows an example of an acoustic tool having one or more transmitters to generate an acoustic signal and having receivers to collect pressure waves in response to the generation of the acoustic signal, according to various embodiments.

FIG. 3 shows an example embodiment of an acoustic tool 305 that can be used in conjunction with a method similar to or identical to a method described herein providing joint time-frequency processing. One or more transmitters 308 may be used to generate pressure waves that travel down the borehole 302 and are picked up at an array composed of two or more receivers 312. The receivers 312 are separated from the one or more transmitters 308 by isolator 309. The receivers 312 in the array can be arranged as a number of stations. For example, the acoustic tool 305 can include eight stations. However, the acoustic tool 305 can have more than or less than 8 stations. A station can be arranged at a particular level along the acoustic tool 305. For example, a station can be disposed at a distance along the longitudinal axis of the acoustic tool 305 from a reference point. Each station can include a number of receivers. For example, a station can include four receivers, each receiver arranged at ninety degrees with respect to an adjacent receiver disposed around an axis of the acoustic tool 305. However, each station can have more than or less than 4 receivers. In operation, signals at each station can be combined, averaged, or weighted, where such processing provides a signal as being from the station acting as a single receiver that the given level.

The pressure waves generated by the one or more transmitters 308 propagate in the mud of the borehole 302 and in the formation 314. With respect to the borehole 302, parameters that contribute to the analysis of the pressure waves detected at the array of receivers include mud compressional slowness ($s_{cm}$), mud density ($d_m$), and borehole radius (r). With respect to the formation 314, parameters that contribute to the analysis of the pressure waves detected at the array of receivers include formation compressional slowness ($s_c$), formation shear slowness ($s_s$), and formation density ($d_f$). In standard operation, the transmitters 308 can be excited that optimally excite certain modes while cancelling others to ensure measurement purity. Measurement purity includes correlating receiving a monopole mode with monopole excitation and receiving a dipole mode with dipole excitation, without unwanted mixing of received data that may correlate monopole modes with dipole excitation and dipole modes with monopole excitation. Since modes of interest peak at different frequencies in different borehole and formation conditions, a pulse that is composed of a range of frequencies can be used. In various embodiments, at least two frequency values are used in joint time-frequency processing.

In operation, an acoustic tool such as acoustic tools 105 and 305 can be operated such that acquisition is performed at a number of different depths. At each depth, the pressure at the receivers are converted to electrical signals, $V_i(t)$, which can be represented as a function of time and receiver index i. The data points provide values that can be mapped to form an image. Each value can be processed to correspond to a particular color, providing a color image. To calculate the slowness of the signal in time domain, a time-slowness image can be obtained by performing time-semblance, TS(t,s), on the data by processing the following $$TS(t, s) = \frac{\left(\sum_{i=1}^{N_r} V_i(t + s(z_i - z_{ref}))\right)^2}{N_r \sum_{i=1}^{N_r} (V_i(t + s(z_i - z_{ref})))^2}, \quad (1)$$

where $N_r$ is the total number of receivers, $z_i$ is axial position of the i'th receiver, and $z_{ref}$ is a reference position. To alleviate the numerical problem when the denominator goes to zero, an averaging filter in time can be applied to the denominator and nominator. The filter length can be chosen sufficiently large to suppress the numerical problem when denominator goes to zero, but small enough not to blur the image significantly. After the image above is obtained, a slowness pick can be performed from TS(t,s) by considering the semblance value peaks, using a picking algorithm $$S_{picked} \xleftarrow{Picking\ Algorithm} (TS(t, s)). \quad (2)$$

To calculate the slowness of the signal in frequency domain, the signal in time $V_i(t)$ can be converted to frequency, $V_i(f)$. This conversion can be accomplished by Fourier transformation. With the pressure at the receivers converted to voltages, the voltages in frequency can be expanded into a series sum of modes, referred to as a pole expansion, as given by $$V_i(f) = \sum_{n=1}^{N_m} A_n (Z_n)^{j-i_{ref}} \quad (3)$$

where $N_m$ is the total number of modes in the expansion, $A_n$ is the complex valued amplitude of mode n, $Z_n$ is the complex valued pole of mode n, and $i_{ref}$ is a reference index. The total number of modes may be set equal to half the number stations of the acoustic tool used to collect the data. A slowness value associated with each mode n can be calculated from the pole of mode n, given as $$s_n = -\frac{imag(\log(Z_n))}{2\pi f \Delta z} \quad (4)$$

A picking algorithm can be employed to choose the best pick of the slowness value from all s values calculated, $$S_{picked} \xleftarrow{Picking\ Algorithm} s_n, \forall f \quad (5)$$

Figure 4:
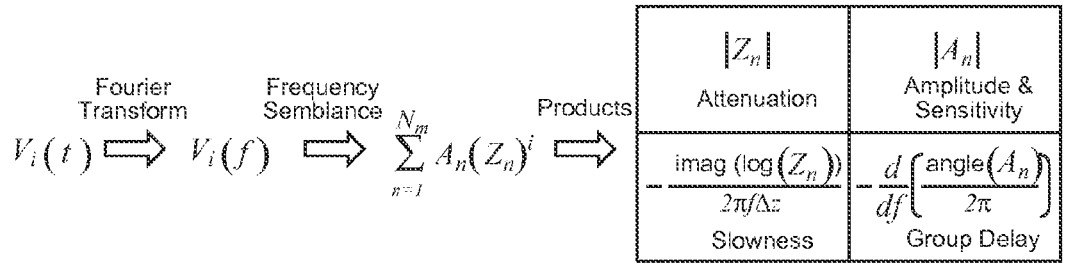
FIG. 4 illustrates an example method of analyzing acoustic signals that includes generation of a delay parameter, according to various embodiments.

In various embodiments of joint time-frequency processing, after complex values of the mode parameters $A_n$ and $Z_n$ are calculated from frequency semblance, they can be related to physical properties of the modes. Two traditional parameters are amplitude and attenuation that are calculated as absolute value of $A_n$ and $Z_n$, respectively. These two traditional parameters are shown as the two upper boxes in FIG. 4. Equation (4) describes another traditional parameter, the slowness parameter that is a fundamental one of the physical properties of the modes. The slowness parameter is shown in the lower left box in FIG. 4. These traditional parameters provide for the use of the information in $A_n$ and $Z_n$, except the phase information in $A_n$, which is unused. As proposed herein, the phase information in $A_n$ contains the time of arrival information. A phase delay calculation, a group delay calculation, or both a phase delay calculation and a group delay calculation can be carried out to provide the time of arrival information. FIG. 4 depicts an embodiment in which a delay for mode n is shown in the lower right box, where the delay is given by $$d_n = -\frac{d}{df}\left(\frac{angle(A_n)}{2\pi}\right) \quad (6)$$

Phase delay is defined as $$-\frac{angle(A_n)}{2\pi f}$$

and group delay is defined as $$-\frac{d}{df}\left(\frac{angle(A_n)}{2\pi}\right).$$

In borehole acoustic applications, modes consist of wave packets, where the use of the group delay may be more appropriate for delays associated with the packets. As a result, group delay is used in the examples discussed below. However, alternative delay definitions may also be used depending on the characteristic of the signal. Group and phase delays are linear in nature and can be used to relate input and output delays of the system, i.e., output delay is equal to input delay plus system delay. Delay obtained via instantaneous frequency, such as via Hilbert Transform or other instantaneous frequency processing, on the other hand, is not linear and may not be as useful in predicting output delays given input delays.

In situations where separate wave packets with the same frequency and slowness arrive at different times, such as in a reflector analysis, the above joint time-frequency processing analysis in which delay is determined can be applied multiple times with each application having a different time window. The same approach can be used to focus the analysis on certain features such as small amplitude P-waves.

The value obtained from the delay calculation is the time of arrival of the associated mode. However, it is referred to as a "delay" to differentiate it from the time dimension data as originally recorded in the measurement and since it reflects the delay between transmission of acoustic waves and the reception of corresponding pressure waves, which is the transit time of the associated mode. After delay values are obtained, they can be paired with frequency, slowness values, or slowness and slowness values for joint interpretation or processing. For example, FIG. 2C shows a two-dimensional (2D) plot made by pairing delay values (x-axis) with slowness values (y-axis).

Figure 5:
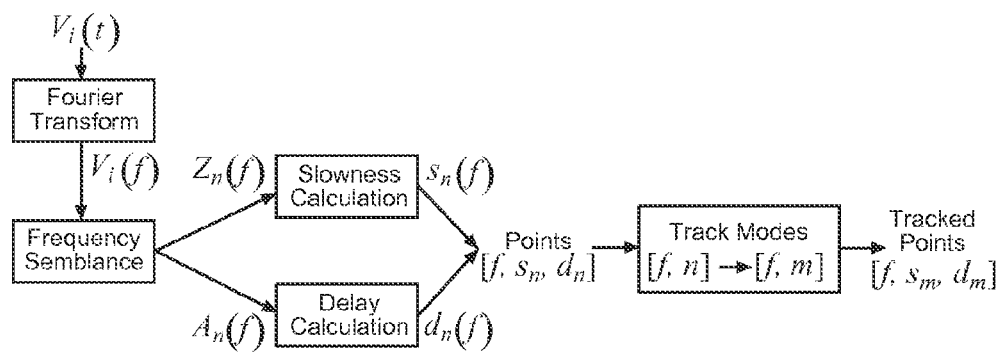
FIG. 5 shows a block diagram of an example scheme to generate a delay parameter to analyze acoustic data, according to various embodiments.

FIG. 5 shows an example embodiment of a delay calculation scheme. Data is first converted to frequency and then both slowness and delay is calculated as a function of frequency f and for each mode n found. A new coordinate system can be formed by pairing frequency, slowness, and delay [f $s_n$, $d_n$]. This coordinate system allows easy joint processing in time-frequency and slowness. Since mode slownesses are calculated independently at each frequency, the order of actual modes may possibly be swapped, for example when $s_{n1}(f1)$ is physically the same mode with $s_{n2}(f2)$, where n1≠n2. A tracking algorithm can be used to swap the modes into their physical order [f, $S_n$, $d_n$] to ensure mode continuity in frequency for fixed n.

Figure 6:
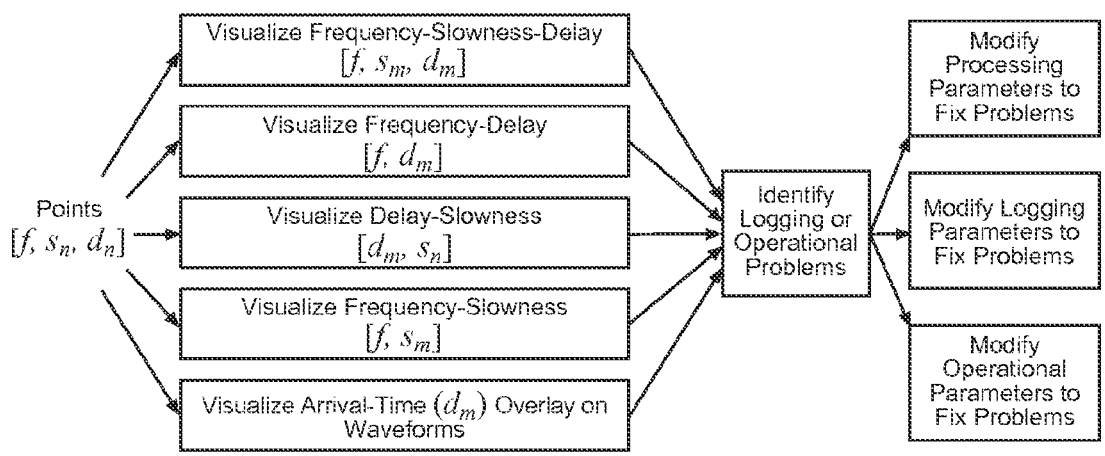
FIG. 6 shows a block diagram of application of delay parameters to identify logging and operational problems, according to various embodiments.

FIG. 6 depicts an example of application of delay calculation to the visualization of the measured data. A one-dimensional, two-dimensional, or three-dimensional valued function F([f, $s_m$, $d_m$]) of points [f, $s_m$, $d_m$] can be used to produce 1D, 2D, and 3D plots, respectively, of data measured from acoustic measurements. A three dimensional plot can be produced by plotting [f, $s_m$, $d_m$]. Similarly, two-dimensional plots can be obtained from [f, $s_m$], [f, $d_m$], or [$d_m$, $s_m$]. In addition, a plot can be produced by marking the calculated arrival times on the waveforms $V_i(t)$. These plots can be processed such that the processed plots can be visualized by an analyst to identify logging or operational problems. If the problem is due to processing, processing parameters can be modified to address it. Examples of processing problems may include, but are not limited to, interference of modes in time, bad fan selection, and inaccurate user input parameters for formation models, for example. If the problem is logging related, logging parameters can be updated and a repeat log may be performed. Examples of logging problems may include, but are not limited to, bad receiver phase, bad transmitter phase, balancing problems, and eccentricity problems, for example. If the problems are operational, operational parameters may be modified. Examples of operational problem may include, but are not limited to, bad borehole conditions and inadequate cement bond, for example. The data in terms of the parameters f, $s_m$, and $d_m$ and the corresponding values of functions such as $F_1$([f, $s_m$, $d_m$]), $F_2$([f, $s_m$]), $F_3$([f, $d_m$]), and $F_4$([$s_m$, $d_m$]) or variations thereof may be processed with appropriate rule sets to identify logging or operational problems in a processing system. Automated processing may be executed to take action in response to identifying logging or operational problems.

As discussed above, joint time-frequency processing can use frequency semblance calculation that involves not only Fourier transformation, but also mode expansion at each frequency. An alternate approach to using frequency semblance can use phase coherence, which can be more computationally efficient than frequency semblance. As a result, phase coherence may be used over larger depths than using frequency semblance, where frequency semblance may be used at limited number of depths. However, frequency semblance can also be used for quality control. Processing phase coherence, which is an alternative to frequency semblance, can be almost as fast as time semblance. Phase coherence can be used to calculate the four boxed parameters in FIG. 4. Phase coherence calculation is similar to time-semblance but applied on the frequency domain data. The phase coherence image is given as:

$$PC(f, s) = \frac{\left|\sum_{i=1}^{N_r} V_i(f)e^{j2\pi fs(z_i - z_{ref})}\right|^2}{N_r \sum_{i=1}^{N_r} \left|V_i(f)e^{j2\pi fs(z_i - z_{ref})}\right|^2} \quad (7)$$

where j is the imaginary number and, as with time semblance, $N_r$ is the total number of receivers, $z_i$ is axial position of the i'th receiver, and $z_{ref}$ is a reference position. The term $e^{j2\pi fs(z_1 - z_{ref})}$ is a phase factor for $V_i(f)$. Similar to time-domain processing, an averaging filter can be used on the image to resolve problems with small denominators. Since peaks of the image at each frequency along slowness dimension are mainly influenced by the dominant mode, they can be used to estimate the slowness profile as defined by $$s_{PC}(f) = \underset{s}{\operatorname{argmax}}(PC(f, s)) \quad (8)$$

Alternative calculations of $s_{PC}(f)$ may be used to estimate the slowness profile from the image.

The frequency-based signals can be processed into an amplitude proportional to a sum of products of the frequency-based signals and a corresponding phase factor, where the phase factor can be based on a slowness from a phase coherence of the frequency-based signals, $s_{PC}(f)$. The amplitude can be processed such that a delay value is generated from operating on the angle of the amplitude. The amplitude and delay parameters can be calculated as follows:

$$A = \frac{1}{N_r}\sum_{i=1}^{N_r} V_i(f)e^{j2\pi fs_{PC}(f)(z_i - z_{ref})} \quad (9)$$

$$|Z| = \frac{1}{N_r - 1}\prod_{i=1}^{N_r-1}\left|\frac{V_{i+1}(f)e^{j2\pi fs_{PC}(f)(z_{i+1} - z_{ref})}}{V_i(f)e^{j2\pi fs_{PC}(f)(z_i - z_{ref})}}\right| \quad (10)$$

$$\text{delay} = -\frac{d}{df}\left(\frac{\text{angle}(A)}{2\pi}\right) \quad (11)$$

Figure 7A:
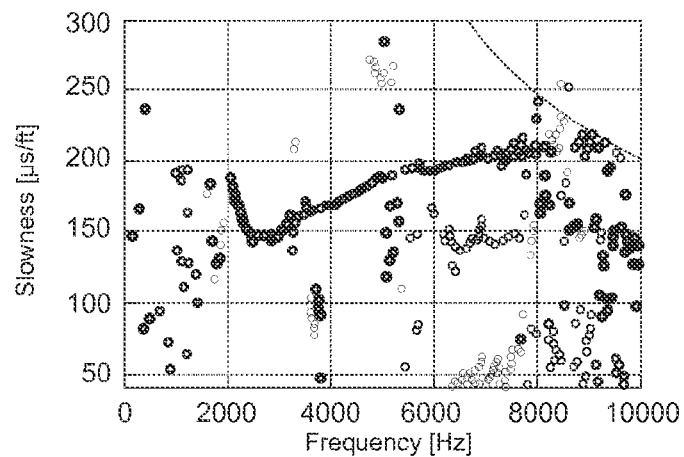
FIGS. 7A-C show an example comparison of a phase coherence method with respect to a frequency semblance, according to various embodiments.
Figure 7B:
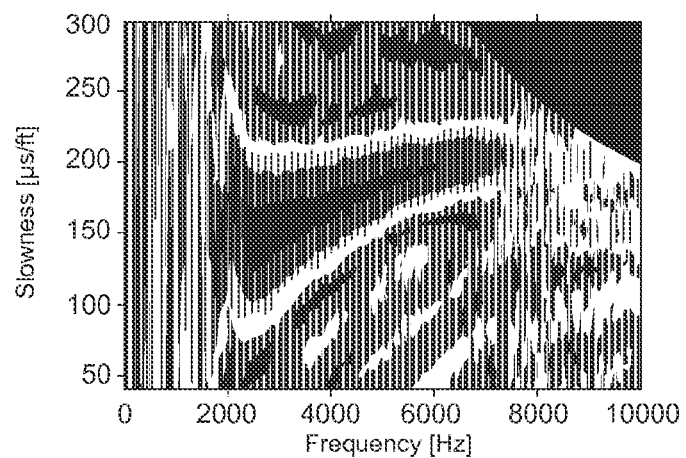
Figure 7C:
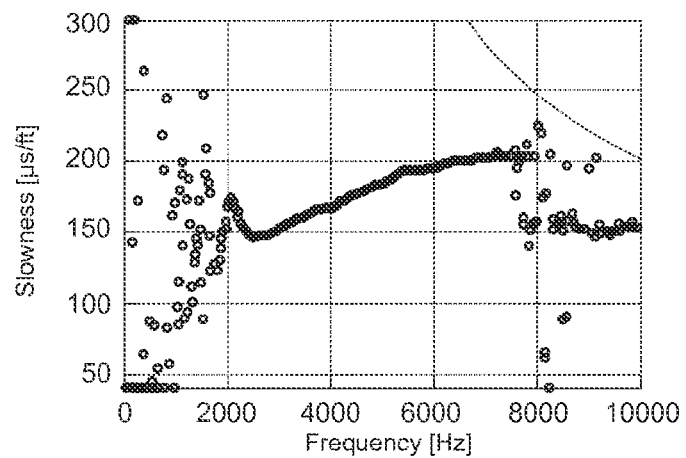

FIGS. 7A-C show an example comparison of the phase coherence method discussed above with respect to the previously discussed frequency semblance. FIG. 7A shows frequency semblance with respect to acoustic data. FIG. 7B reflects phase coherence with respect to the acoustic data of the frequency semblance of FIG. 7A. FIG. 7(C shows a phase coherence profile that can be compared with the frequency semblance of FIG. 7A.

Due to physical considerations and limits on material properties, slowness, arrival time (delay), and frequency of the modes can only be observed within certain regions. It is therefore possible to use this a-priori information to check if data points fall in the expected region and eliminate certain unwanted effects, such as noise or secondary modes. A straightforward rule to conduct such elimination can be based on causality of signals, which dictates that activated pressure waves cannot arrive at the receiver sooner than their speeds multiplied by the travel distance, i.e., t>z×s. The fan associated with this can be written as:

$$\text{fan}(t, s) = \begin{cases} 1, & \text{if } t > zs \\ 0, & \text{otherwise} \end{cases} \quad (12)$$

This fan can be applied to the time processing image result via multiplication as $$TS^{new}(t,s) = TS(t,s) \text{fan}(t,s) \quad (13)$$

The generation of the delay (arrival time) parameter provides another dimension for analysis. Fans can be produced with a combination of three dimensions: frequency, slowness, and delay (time). Fans can be applied to the frequency processing result, (f, $s_n$, $delay_n$), via discarding the solutions that lie out of the fan, as follows $$\text{action on point } (f, n) = \begin{cases} \text{keep,} & \text{if fan}(f, s_n, delay_n) = 1 \\ \text{discard,} & \text{otherwise.} \end{cases} \quad (14)$$

Figure 8:
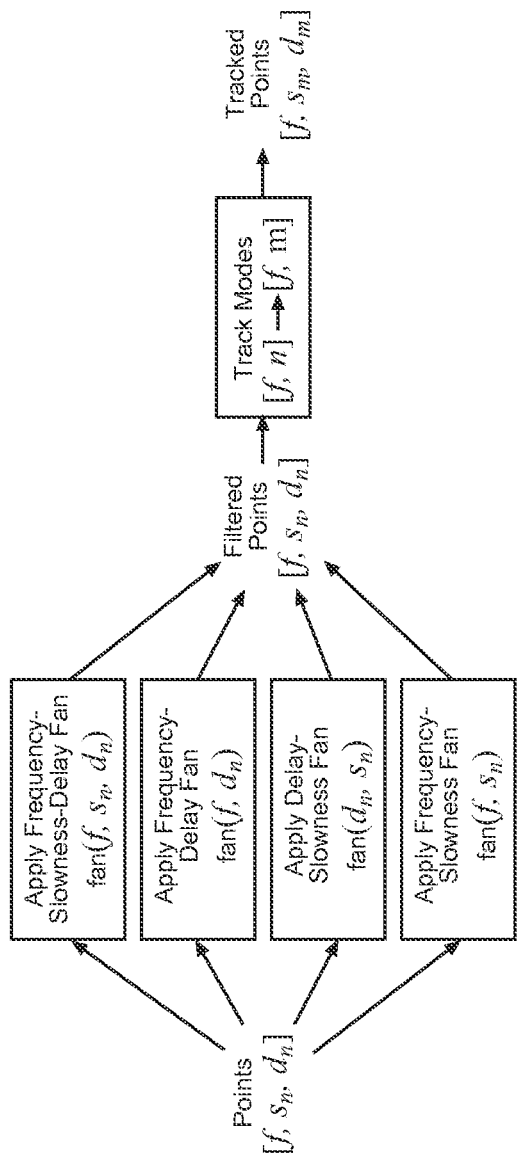
FIG. 8 depicts fan application with joint time-frequency information, according to various embodiments.

Mode tracking can ideally be applied after the fan operation, since it may be more accurate to track modes with less unwanted modes and noise, as reflected in FIG. 8.

Fans, providing filtering on points [f, $s_n$, $d_n$], can be useful before slowness picking, since they can eliminate noise and interference from unwanted modes. They can also be used to improve inversion based on dispersion curves in which dispersion curves are inverted for modeling parameters. Inversion is usually based on the distance between the data curves and modeling curves, and a more accurate distance measure can be obtained without noise and non-inverted modes. Time of arrival of signals (delay parameter) are indicative of the nature of the signal in applications such as, but not limited to, radial profiling, cement bond log, identifying reflectors, and near-borehole imaging. For example, in all applications, signals from features that are far from the borehole axis produce later arrivals in time. As a result, the fan as mentioned above can be used to highlight those features in time, while analyzing them in frequency at the same time. The signals may be converted back to time domain after fan application via equation (3) followed by an inverse Fourier transform. As a result, a clean version of the original waveforms can be obtained.

Figure 9:
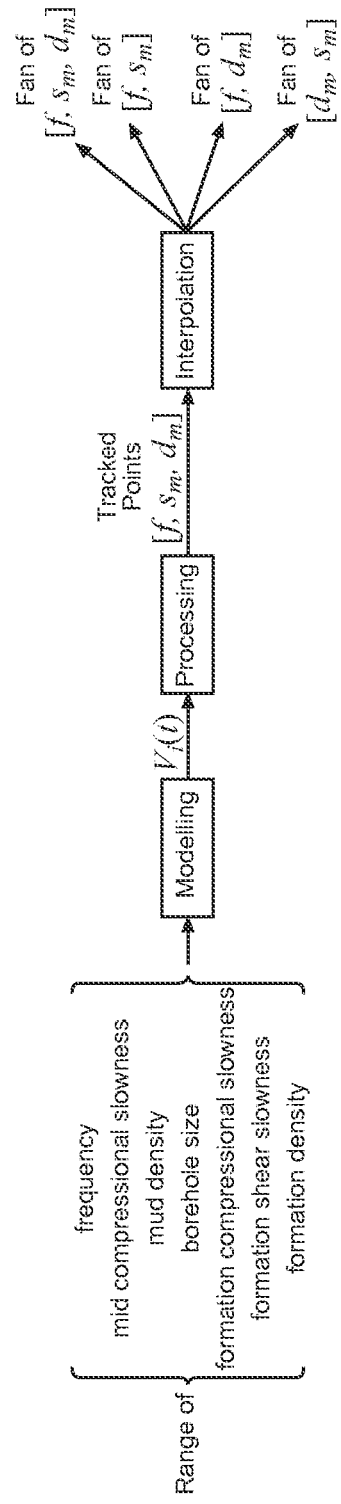
FIG. 9 illustrates an example of an optimized fan design methodology, in accordance with various embodiments.

If modeling is available and the ranges of expected geophysical parameters are known, it is possible to find an expected range of frequency, slowness and arrival time of signals. FIG. 9 shows an example embodiment of an optimized fan design methodology using such parameters. First, a range of frequency, mud, borehole, and formation parameters is discretized to form a grid. Collection of points in this grid can be referred to as a library. Modeling is run for each point in the library and the resulting signal is passed through the processing shown in FIG. 5. Each resulting point is enumerated and points ($f_i$, $s_i$, $d_i$) are formed. The cluster of points is then interpolated to yield a multi-dimensional volume as the fan. Typically, a fan can be chosen as the collection of points in the vicinity of points i. In an embodiment, the following fans can be formed:

$$\text{fan}_{FS} = \begin{cases} 1, & \exists i, |f_i^l - f_i^d| < \Delta f \text{ and } |s_i^l - s_i^d| < \Delta s \\ 0, & \text{otherwise.} \end{cases} \quad (16)$$
(frequency-slowness)

$$\text{fan}_{FD} = \begin{cases} 1, & \exists i, |f_i^l - f_i^d| < \Delta f \text{ and } |d_i^l - d_i^d| < \Delta d \\ 0, & \text{otherwise.} \end{cases} \quad (17)$$
(frequency-delay)

$$\text{fan}_{DS} = \begin{cases} 1, & \exists i, |d_i^l - d_i^d| < \Delta d \text{ and } |s_i^l - s_i^d| < \Delta s \\ 0, & \text{otherwise.} \end{cases} \quad (18)$$
(delay-slowness)

$$\text{fan}_{FSD} = \begin{cases} 1, & \exists i, |f_i^l - f_i^d| < \Delta f, \ |s_i^l - s_i^d| < \Delta s \text{ and } |d_i^l - d_i^d| < \Delta d \\ 0, & \text{otherwise.} \end{cases} \quad (19)$$
(frequency-delay-slowness)

where,
$\Delta f$: frequency threshold for comparison
$\Delta s$: slowness threshold for comparison
$\Delta d$: delay threshold for comparison
$f_i^l$: frequency of i'th point in library
$s_i^l$: slowness of i'th point in library
$d_i^l$: delay of i'th point in library
$f_i^d$: frequency of i'th point in data
$s_i^d$: slowness of i'th point in data
$d_i^d$: delay of i'th point in data In various embodiments, joint time-frequency processing can utilize phase information from frequency semblance amplitude results to obtain time of arrival information that can be directly mapped to the existing frequency and slowness results. As a result, a joint frequency-slowness-time (3D) analysis and processing can be made. Joint time-frequency processing can provide enhancements over the existing 2D algorithms that depend on either frequency-slowness or time-slowness. It also allows 2D time-frequency processing, which was not available by traditional processing of acoustic data. The joint time-frequency processing can produce interference-free time-slowness plots, as opposed to standard time-semblance plots in which modes can constructively or destructively interfere. The joint time-frequency processing can be used to visualize the frequency-slowness-time data for diagnostics; to provide quality control; and to identify and solve processing, logging, operational problems, or combinations thereof. Fans that use joint time-frequency information can be designed to remove noise or unwanted modes. In a simple slowness measurement, such fans can clear a, large portion of the noise and produce more accurate and stable results. In applications such as radial profiling, reflector analysis, cement bond log, and near-wellbore imaging, the joint time-frequency processing can be performed to filter out and analyze signals traveling different distances. When applied to modeling data, the joint time-frequency processing can produce very accurate estimates of arrival times with respect to frequency, which can be used is various applications, such as making caliper measurements with a sonic tool.

Figure 10A:
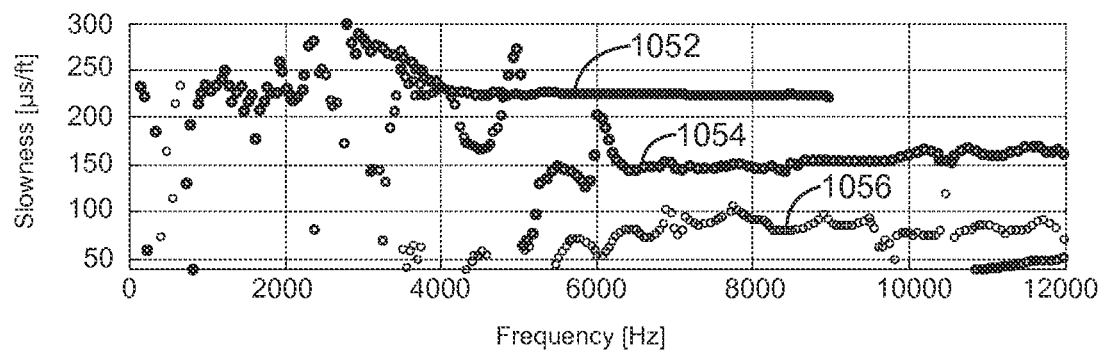
FIGS. 10A-C illustrate different visualizations of joint time-frequency data, in accordance with various embodiments.
Figure 10B:
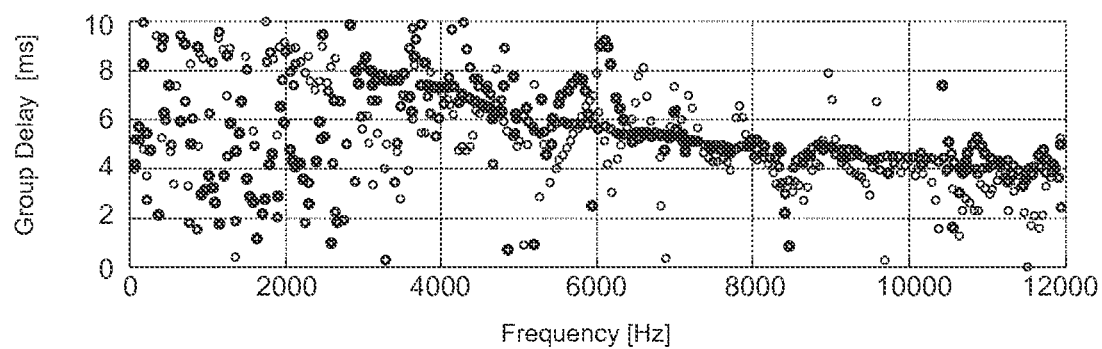
Figure 10C:
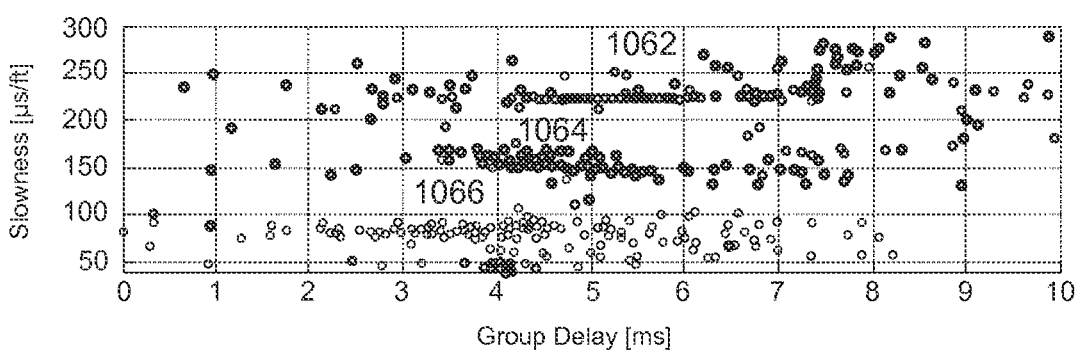

FIGS. 10A-C shows frequency-slowness [$f_i$, $s_i$], frequency-delay [$f_i$, $d_i$], and delay-slowness [$d_i$, $s_i$] plots, respectively, for an example monopole excitation data. It can be seen from FIG. 10A that three modes are visible and clearly identified: monopole mode 1052, refracted shear mode 1054, and compressional mode 1056. FIG. 10B shows the arrival times (group delay) of different modes where higher frequency modes arrive sooner, partially due to shallower penetration into the formation and resulting lower travel time. This information may be especially useful in borehole acoustic radial profiling application where an association of radial distance with delay and slowness can be made. FIG. 10C shows a time-semblance like plot obtained by pairing $d_i$ and $s_i$ values for monopole mode 1062, refracted shear mode 1064, and compressional mode 1066. FIGS. 10A-C demonstrate that embodiments of joint time-frequency processing allow joint time-frequency-slowness analysis and processing of borehole acoustic signals.

FIG. 11C show an overlay of time semblance plot of FIG. 11B and delay-slowness plot of FIG. 11A. These figures demonstrate that embodiments of joint time-frequency processing provide time-slowness curves that are not affected by frequency interference. It can be seen in FIG. 10C, FIG. 11A, and FIG. 11C that all compressional (P), refracted shear (Sr), and Stoneley (St) modes minimally interfere with each other. Between 4-5 ms, all three modes can be observed at the same time. This is not possible with time-semblance due to interference and only the modes with dominant magnitude are visible. It can be seen in FIG. 11B that refracted shear is not visible in time-semblance due to interference with Stoneley waves.

Figure 12B:
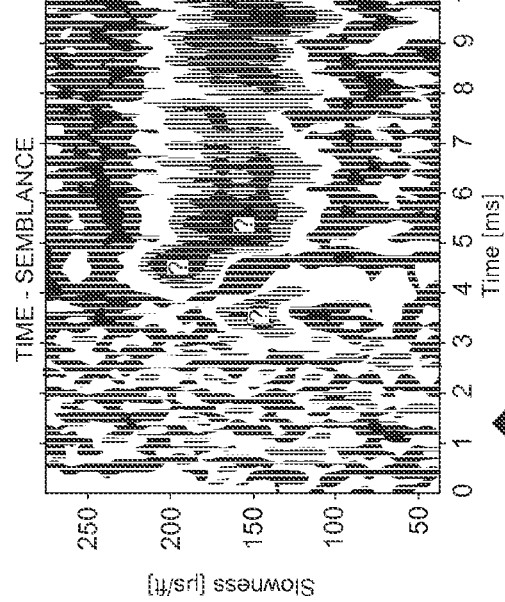
FIGS. 12A-C show a delay-slowness plot, a time semblance plot, and an overlay of these plots for dipole excitation, in accordance with various embodiments.
Figure 12A:
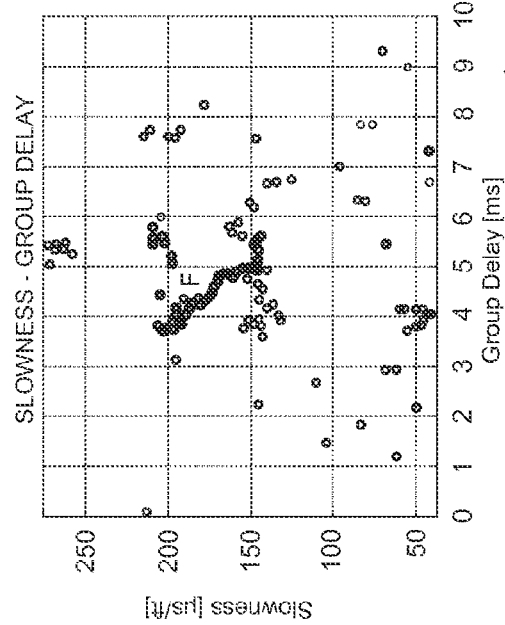
Figure 12C:
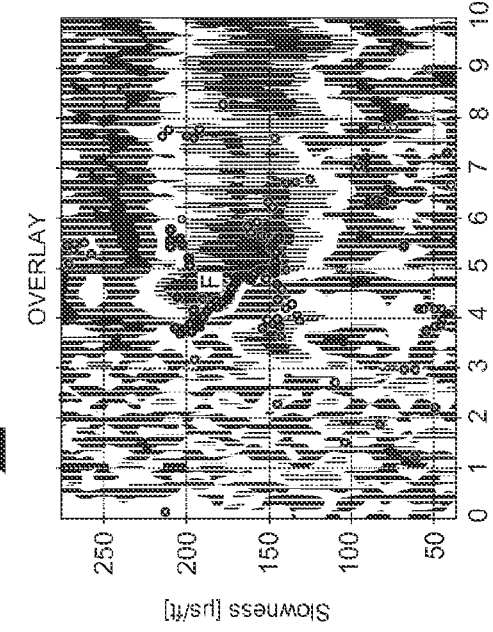

FIG. 12C show an overlay of time semblance plot of FIG. 12B and delay-slowness plot of FIG. 12A for dipole excitation similar to the overlay plot of FIG. 11C with respect to FIG. 11A and FIG. 11B for monopole excitation. When compared to the time-semblance result, delay-slowness offers a simpler plot that is easier to interpret both visually and algorithmically.

Figure 13A:
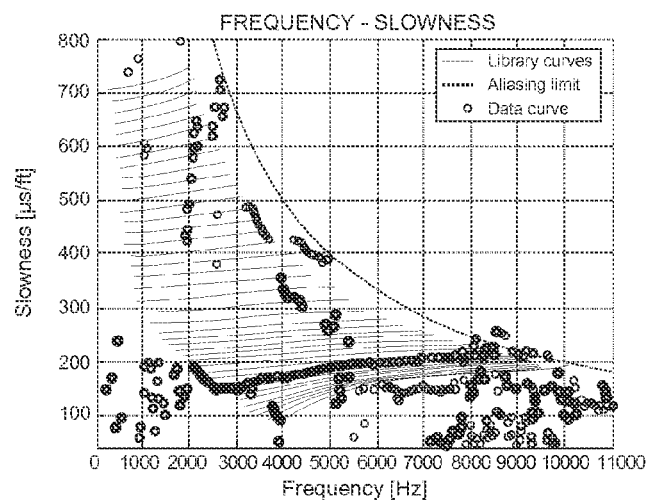
FIGS. 13A-C show overlay of library curves on example dipole data, in accordance with various embodiments.
Figure 13B:
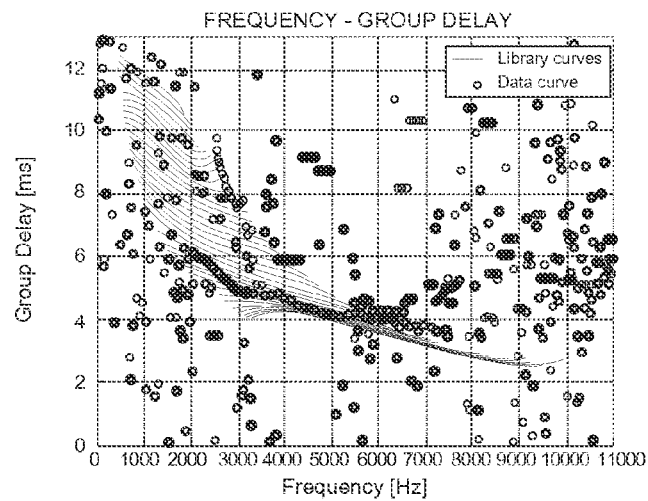
Figure 13C:
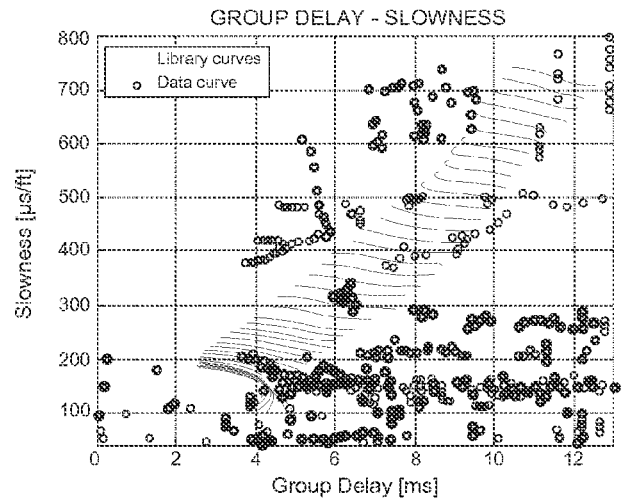

FIGS. 13A-C show 2D library curve overlay on example data dipole curves. FIGS. 13A-C show 2D library curves along with example dipole excitation data that can be used with respect to fan optimization such as, but not limited to, the method shown in FIG. 9. The data includes compressional mode (P), shear mode (Sr), and Stoneley mode (St) data. Library parameters can include a borehole diameter (ID), a shear slowness (DTS), a compressional slowness (DTC), a mud slowness (DTM), where as noted above slowness is inverse of velocity. The library parameters for the curves in FIGS. 13A-C include a mud density $d_m$=1100 kg/m$^3$, DTM=210 µs/ft, an ID=9 inches, a DTS/DTC=2, a formation density=2300 kg/m$^3$, a DTS having a value from 80 to 700. The library data can be for dipole results with chirp excitation and 3$^{rd}$ order polynominal curve fit. Some of the parameters can be estimated from other tools or a-priori information. It can be seen that there is a good match between behavior of the library curves and the data.

Figure 14A:
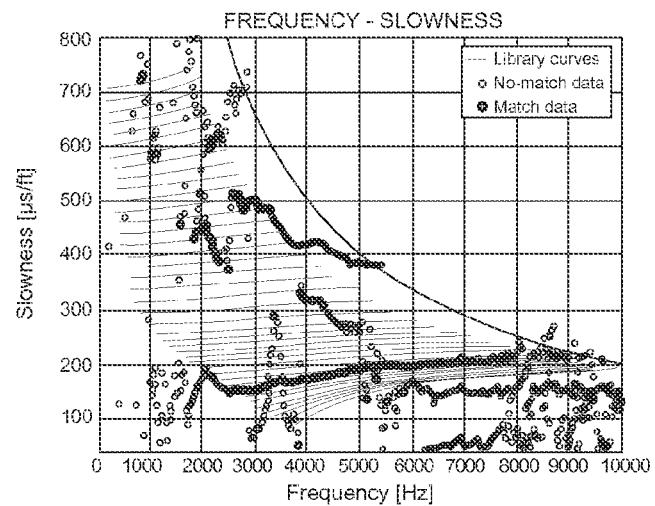
FIGS. 14A-C show results of application of a three-dimensional fan, in accordance with various embodiments.
Figure 14B:
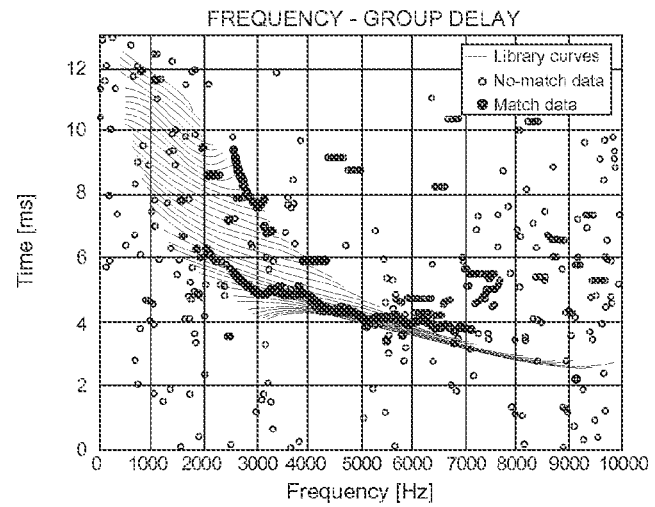
Figure 14C:
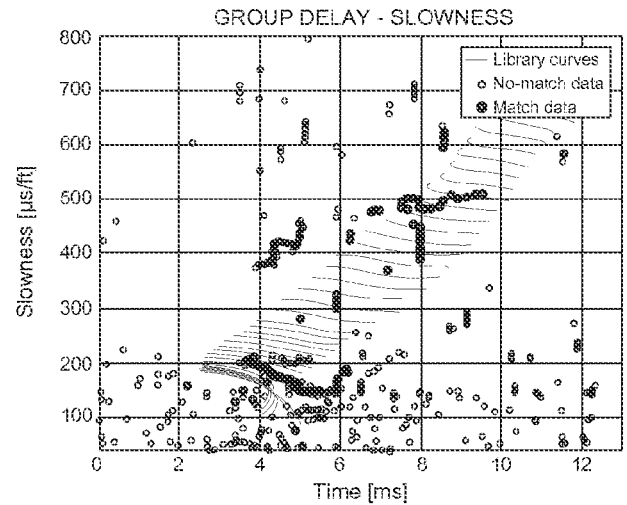

FIGS. 14A-C shows results of application of a 3D fan. The 3D fan was constructed via Equation (19) using the library of curves in FIGS. 13A-C. The comparison parameters used in this example include Δf=200 Hz, Δs=40 µs/ft, and Δs=–0.5 ms. It can be seen from FIG. 14A-C that most of the noise and additional modes are filtered out, as indicated by the open circles reflecting unmatched data. An accurate portion of the flexural mode (between 2500-7000 Hz) is obtained successfully.

Figure 15A:
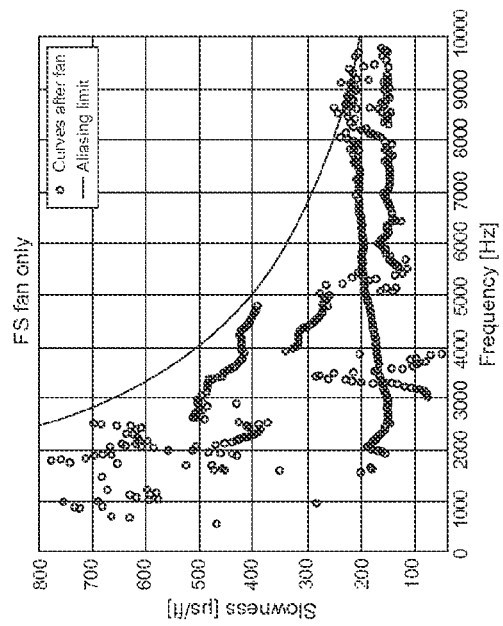
FIGS. 15A-D compare results from different fans, in accordance with various embodiments.
Figure 15B:
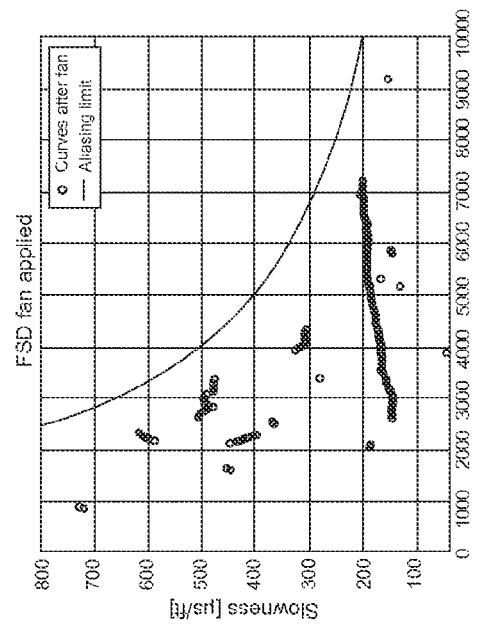
Figure 15C:
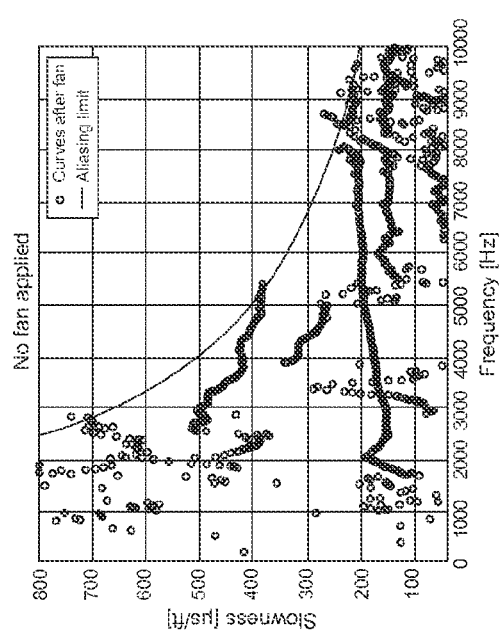
Figure 15D:
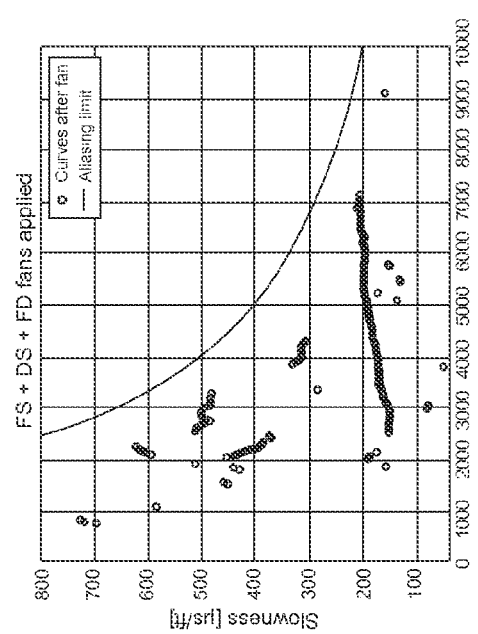

FIGS. 15A-D compare results from different fans with respect to FIGS. 14A-C. FIG. 15A shows slowness versus frequency with no fan applied. FIG. 15B shows application of a frequency-slowness $[f_i, s_i]$(FS) fan. FIG. 15C shows application of a serial combination of $[f_i, s_i]$, $[d_i, s_i]$, and $[f_i, d_i]$(FS+DS+FD) fans. FIG. 15D shows application of a frequency-slowness-delay $[f_i, s_i, d_i]$(FSD) fan. It can be seen from FIGS. 15A-D that fans that include delay can eliminate a larger set of noise and unwanted modes. The library curves with the processed data allow application of time-based fans on frequency domain dispersion curves as demonstrated from FIGS. 13A-C-FIGS. 15A-D.

Figure 16:
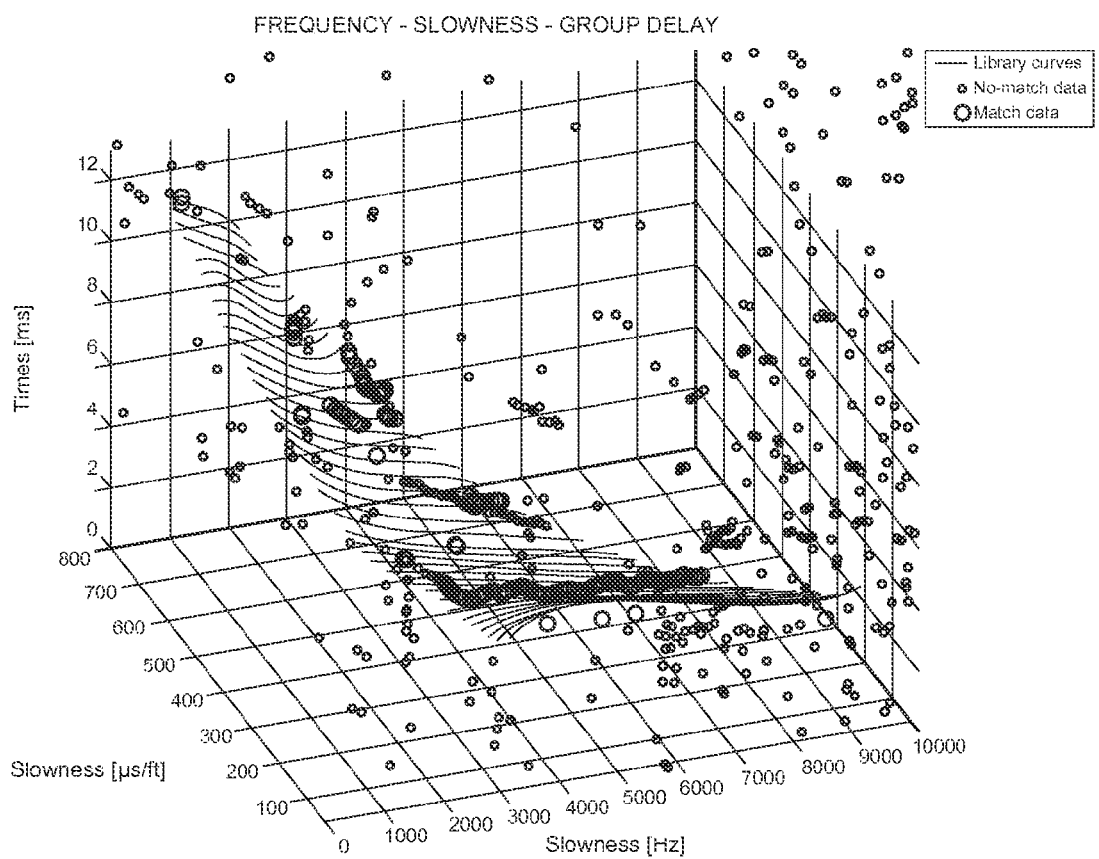
FIG. 16 shows a three-dimensional frequency-slowness-delay plot of the example shown in FIG. 14, in accordance with various embodiments.

FIG. 16 shows a 3D frequency-slowness-delay plot of the example shown in FIGS. 14A-C. The 3D fan is shown with lines, the open circles represent matched data, and the closed circles represent data not matched data. The relative performance of the 3D fan has been demonstrated via FIGS. 14A-C and 15A-D. FIG. 16 and FIG. 14A-C show that 3D fans can be provided that can more effectively eliminate noise and unwanted modes.

Embodiments of joint time-frequency processing allow model-based time-of-arrival estimates that include full-physics analysis such as propagation delays through mud. Calculation of arrival times may be important in some applications, since it allows identification and isolation of modes that are fully or partially decoupled in time. In practice, most empirical formulas for arrival time assume linear paths between the transmitter and receiver. These empirical formulas may not be very accurate, since waves travel in multiple paths and with differing strengths. Combined with modeling, embodiments of joint time-frequency processing can offer a straightforward way to calculate time of arrival of modes with respect to frequency.

Figure 17:
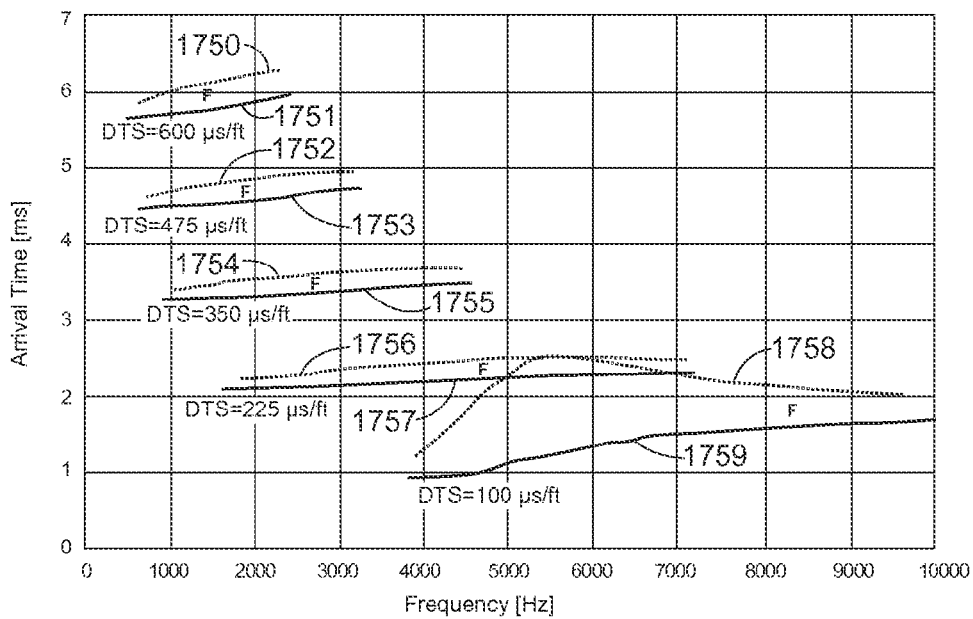
FIG. 17 shows a comparison between an approximate time of arrival calculation and a delay calculation from group delay for different shear slowness values for dipole excitation, in accordance with various embodiments.

FIG. 17 shows a comparison between an approximate time of arrival calculation and a delay calculation from group delay for different shear slowness values for simulated dipole excitation. The data curves for flexural mode (F). Modeling parameters include a mud density $d_m$=1100 kg/m$^3$, DTM=200 µs/ft, an ID=8 inches, a DTS/DTC=2, and a formation density $d_f$=2200 kg/m$^3$. Standard approximation can provide an arrival time $$\Delta t \approx -(\text{imag}(\log(z_n))/2\pi f \Delta z) * \Delta z_{TR1} = \text{DTS} * \Delta z_{TR1}.$$

Group delay can provide an arrival time $$\Delta t = -\frac{d}{df}\left(\frac{\text{angle}(A_n)}{2\pi}\right),$$

where $A_n$ is a function of f.

Curve 1751 is generated for arrival time from a standard approximation with DTS=600 µs/ft. Curve 1750 is generated for arrival time from group delay with DTS=600 µs/ft. Curve 1753 is generated for arrival time from a standard approximation with DTS=475 µs/ft. Curve 1752 is generated for arrival time from group delay with DTS=475 µs/ft. Curve 1755 is generated for arrival time from a standard approximation with DTS=350 µs/ft. Curve 1754 is generated for arrival time from group delay with DTS=350 µs/ft. Curve 1757 is generated for arrival time from a standard approximation with DTS=225 µs/ft. Curve 1756 is generated for arrival time from group delay with DTS=225 µs/ft. Curve 1759 is generated for arrival time from a standard approximation with DTS=100 µs/ft. Curve 1758 is generated for arrival time from group delay with DTS=100 µs/ft. It can be seen that for slow modes, approximate and delay-based calculations match relatively well. However, for fast modes, additional delays are observed near the bend of the dispersion curves, for example, between 5-6 KHz in FIG. 17.

Figure 18A:
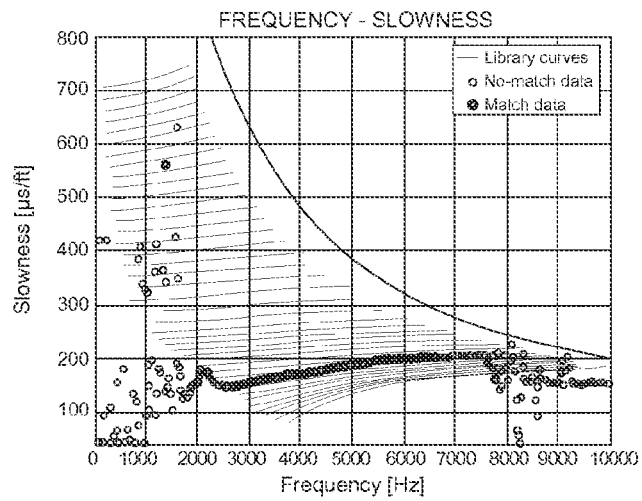
FIGS. 18A-C show three-dimensional fan application results with phase coherence used in the joint time-frequency processing, in accordance with various embodiments.
Figure 18B:
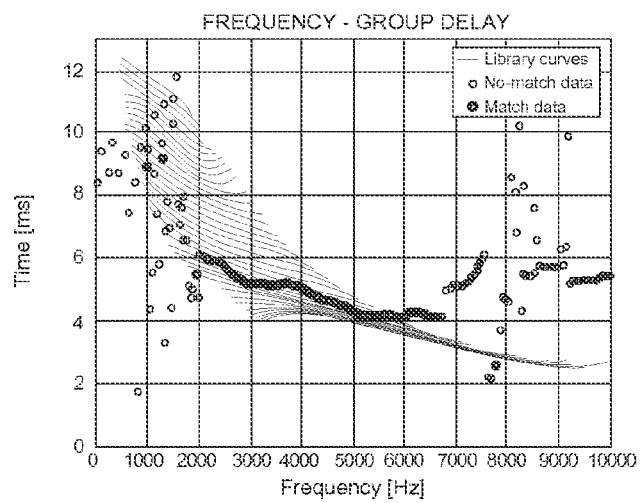
Figure 18C:
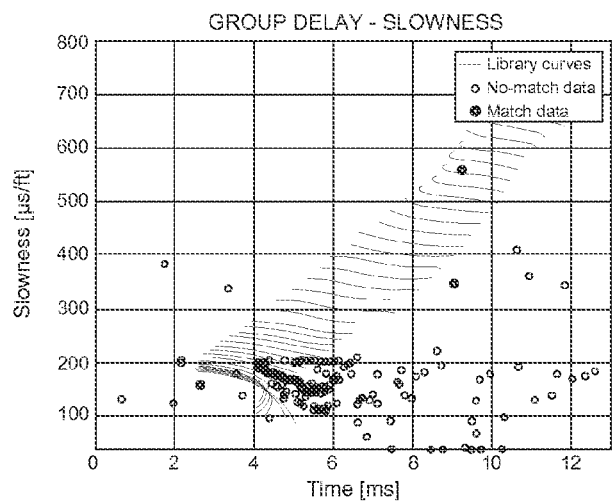

In various embodiments, joint time-frequency processing can be performed with phase coherence, which, as noted, may be a more computationally efficient processing alternative to frequency semblance. FIGS. 18A-C show 3D fan application results with phase coherence used in the joint time-frequency processing of data. An efficient calculation with phase coherence, as discussed with respect to equations (7)-(11), can be conducted replacing the frequency semblance in the joint time-frequency processing. The results in FIGS. 18A-C are for the example case used with FIG. 14 with fan comparison parameters that include Δf=200 Hz, Δs=40 μs/ft, and Δs=0.5 ms. It can be seen that the dominant (flexural) mode is accurately recovered. In cases where modes of interest appear in different frequency bands and dominate the spectrum at those bands, phase coherence can produce results with an accuracy as good as frequency semblance. Phase coherence results are observed to be slightly smoother since they are not subject to mode extraction and associated (bad-conditioned) inverse problem.

Joint time-frequency processing, as taught herein, enables joint time-frequency analysis and may improve processing and diagnostic of borehole acoustic data. It may allow easy quality control and identification of processing, logging, or operational problems, which improve log quality. With use of three dimensional time-frequency-semblance fans, noise and unwanted modes may be more accurately eliminated, which can allow more accurate and stable slowness picking, better compressional and shear slowness curves, and improved applications such as radial profiling, reflector analysis, cement bond log, and near-wellbore imaging. The improved manual and system-based algorithmic processing of acoustic signals provided by embodiments of joint time-frequency processing may improve the quality control and the interpretation of acoustic data and products such as compressional, refracted shear, Stoneley, flexural, and quadrupole slowness logs. Radial profiles can be more accurately recovered and Stoneley reflectors can be more accurately identified.

Figure 19:
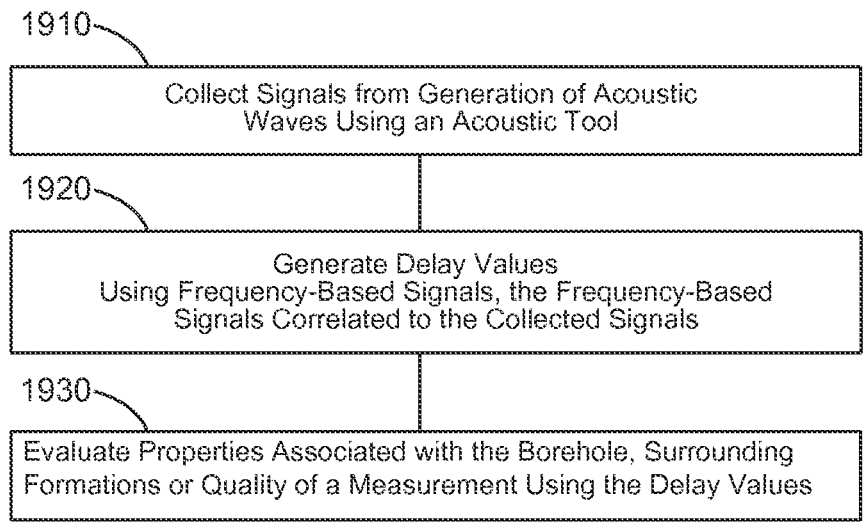
FIG. 19 shows features of an embodiment of an example method that includes using a processor and data storage device coupled to an acoustic tool to process signals generated from operating the acoustic tool in a borehole, in accordance with various embodiments.

FIG. 19 shows features of an embodiment of an example method that includes using a processor and data storage device coupled to an acoustic tool to process signals generated from operating the acoustic tool in a borehole. At 1910, signals are collected from generation of acoustic waves using the acoustic tool. Collection of data signals can be conducted in the time domain. Data can be collected in the frequency domain and used directly. Alternatively, data can be collected in frequency domain and then converted to time domain. Collecting time-based signals can include acquiring pressure waves at receivers of the acoustic tool, the pressure waves generated by a transmitter of the acoustic tool at different depths of the borehole. Acquiring pressure at receivers of the acoustic tool can include acquiring pressure at a plurality of stations of the tool, each station having a plurality of receivers around the acoustic tool. Collecting time-based signals from generation of acoustic waves using the acoustic tool can include generating acoustic waves at a plurality of frequencies from the acoustic tool.

At 1920, delay values are generated using frequency-based signals, where the frequency-based signals are correlated to the collected signals. Generating delay values can include processing a phase of a complex valued amplitude. Generating delay values can include processing the frequency-based signals into a representation that is a series sum of modes, where each mode has an amplitude and a pole; and processing the amplitude of a mode such that a delay value is generated. The method can include converting pressure at receivers of the acoustic tool to voltages expanded into a series sum of modes given by $$V_i(f) = \sum_{n=1}^{N_m} A_n (Z_n)^{j-i_{ref}}$$

where $N_m$ is a total number of modes in the expansion, $A_n$ is a complex valued amplitude of mode n, $Z_n$ is a complex valued pole of mode n, and $i_{ref}$ is a reference index, and the delay is generated according to $$d_n = -\frac{d}{df}\left(\frac{\text{angle}(A_n)}{2\pi}\right).$$

Generating delay values can include processing the frequency-based signals into an amplitude proportional to a sum of products of the frequency-based signals and a corresponding phase factor, the phase factor based on a slowness from a phase coherence of the frequency-based signals; and processing the amplitude such that a delay value is generated. The method can include collecting voltages from receivers of the acoustic tool and generating the delay according to $$\text{delay} = -\frac{d}{df}\left(\frac{\text{angle}(A_n)}{2\pi}\right) \text{ from}$$

$$A = \frac{1}{N_r}\sum_{i=1}^{N_y} V_i(f)e^{j2\pi f s_{PC}(f)(z_i - z_{ref})}$$

with A being amplitude where j is the imaginary number, $N_r$ is a total number of receivers, $z_i$ is axial position of an i'th receiver, $z_{ref}$ is a reference position, and $s_{PC}(f)$ is a slowness from a phase coherence as a function of frequency. Processing the amplitude can include determining a phase delay of the mode or determining a group delay of the mode. Determining the phase delay can include determining $$-\frac{\text{angle}(A_n)}{2\pi f}$$

and determining the group delay can include determining $$-\frac{d}{df}\left(\frac{\text{angle}(A_n)}{2\pi}\right),$$

$A_n$ being a complex-valued amplitude of mode n. Slowness values can be generated using frequency-based signals. The slowness values can be generated according to $$s_n = -\frac{\text{imag}(\log(Z_n))}{2\pi f \Delta z}.$$

At 1930, properties associated with the borehole, surrounding formations, or quality of a measurement are evaluated using delay values. Evaluating properties associated the borehole can include pairing the delay values with frequency, pairing the delay values with slowness values, or pairing the delay values with frequency and pairing the delay values with slowness values. Slowness values and the delay values combined with frequency values can be applied as a fan to generate filtered points. Generating filtered points includes applying a fan based on the frequency values and the delay values, applying a fan based on the delay values and slowness values, and applying a fan based on the frequency values and slowness values. Generating filtered points can include applying a fan on a point, the point given by frequency and mode (f, n), according to a three-dimension coordinate system of frequency, slowness, delay of a mode, (f, $s_n$, $delay_n$), by discarding the solutions that lie out of the fan according to $$\text{action on point }(f, n) = \begin{cases} \text{keep,} & \text{if fan}(f, s_n, delay_n) = 1 \\ \text{discard,} & \text{otherwise.} \end{cases}$$

The method can include discretizing a range of frequency, mud, borehole, and formation parameters to form a grid of points; performing a modeling on each point to generate modeled received acoustic signals; processing the received acoustic signals forming points ($f_i$, $s_i$, $d_i$) corresponding to frequency (f), slowness (s), and delay (d) of each point; and interpolating the formed points to yield a multi-dimensional volume as a fan. The method can include forming a frequency-slowness-delay fan ($fan_{FSD}$) with respect to the grid of points and data according to $$fan_{FSD} = \begin{cases} 1, & \exists i, |f_i^l - f_i^d| < \Delta f, |s_i^l - s_i^d| < \Delta s \text{ and } |d_i^l - d_i^d| < \Delta d, \\ 0, & \text{otherwise.} \end{cases}$$

where
Δf: frequency threshold for comparison
Δs: slowness threshold for comparison
Δd: delay threshold for comparison
$f_i^l$: frequency of i'th point in the gird
$s_i^l$: slowness of i'th point in the gird
$d_i^l$: delay of i'th point in the gird
$f_i^d$: frequency of i'th point in the data
$s_i^d$: slowness of i'th point in the data
$d_i^d$: delay of i'th point in the data.

The method can include using the calculated delay values to determine a window in time for further processing in time. The method can include determining delay values multiple times with each determination having a different time window to evaluate separate wave packets with a same frequency and slowness arriving at different times.

The evaluated properties associated with the borehole can be used to direct drilling operations in the borehole. Such subsequent operations may be realized using a rule set stored and executed in an automated system.

In various embodiments, a machine-readable storage device can be structured having instructions stored thereon, which, when performed by a machine, cause the machine to perform operations that include using a processor and data storage device coupled to an acoustic tool to process signals generated from operating the acoustic tool in a borehole. The operations can comprise features of one or more methods similar to or identical to features associated with methods discussed herein including the discussions at 1910-1930 above.

In various embodiments, a system comprises an acoustic tool having a transmitter and an array of receivers; a control unit operable to manage generation of acoustic signals from the transmitter and to manage collection of received signals at the receiver; and a processing unit, wherein the acoustic tool, the control unit, and the processing unit are configured to operate to perform operations that include using a processor and data storage device coupled to the acoustic tool to process signals generated from operating the acoustic tool in a borehole. The operations can comprise features of methods similar to or identical to features associated with methods discussed herein including the discussions at 1910-1930 above.

Figure 20:
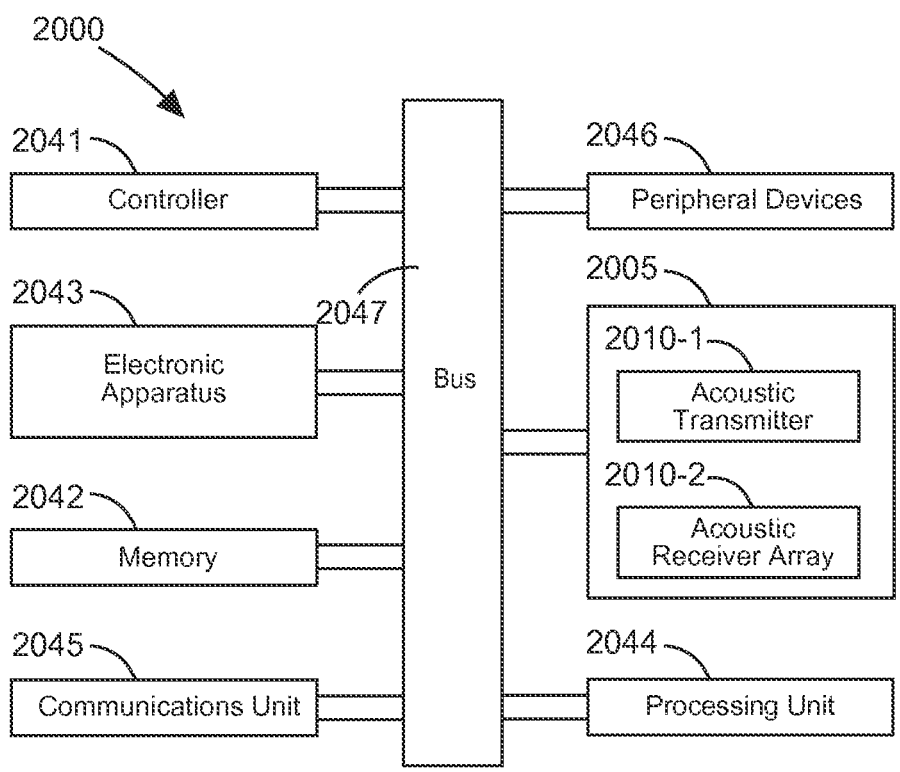
FIG. 20 depicts a block diagram of features of an example system having an acoustic tool, where the system is operable to analyze signals collected in the acoustic tool using a joint time-frequency processing scheme, in accordance with various embodiments.

FIG. 20 depicts a block diagram of features of an example embodiment of a system 2000 having an acoustic tool 2005 configured with one or more acoustic transmitters 2010-1 and an acoustic receiver array 2010-2, where the acoustic tool 2005 is operable in a borehole. The tool 2005 having an arrangement of the acoustic transmitters 2010-1 and the acoustic receiver array 2010-2 can be realized in a similar or identical manner to arrangements of acoustic tools discussed herein. Components of the system 2000 are operable to collect received signals at the acoustic receiver array 2010-2 and to perform joint time-frequency processing of the acoustic signals on data generated from signals acquired at the acoustic receiver array 2010-2. The joint time-frequency processing of the received acoustic signals can implement delay calculation from amplitude phase representations of the received acoustic signals. The system 2000 can be arranged to perform various operation on the data, acquired from the acoustic receiver array 2010-2, in a manner similar or identical to any of the processing techniques discussed herein.

The system 2000 can include a controller 2041, a memory 2042, an electronic apparatus 2043, and a communications unit 2045. The controller 2041, the memory 2042, and the communications unit 2045 can be arranged to operate as a processing unit to control activation of the tool 2005 and to perform one or more signal and data manipulations on the signals collected by the tool 205 to analyze formation properties associated with operations in a borehole. A processing unit, to engage in analysis of acoustic signals and data, can be distributed among the components of system 2000 including the electronic apparatus 2043. Alternatively, the system 2000 can include a processing unit 2044 to control activation of the one or more the acoustic transmitters 2010-1 and collection of signals in receivers of the acoustic receiver array 2010-2 in the tool 2005 and to manage processing schemes in accordance with measurement procedures and signal processing as described herein. The processing unit 2044 and/or other components of the system 2000 can be configured to operate similar to or identical to any of the processing techniques taught herein.

The communications unit 2045 can include communications for operation downhole. Such downhole communications can include a telemetry system. Communications unit 2045 may use combinations of wired communication technologies and wireless technologies at frequencies that do not interfere with on-going measurements.

The system 2000 can also include a bus 2047, where the bus 2047 provides electrical conductivity among the components of the system 2000. The bus 2047 can include an address bus, a data bus, and a control bus, each independently configured. The bus 2047 can be realized using a number of different communication mediums that allows for the distribution of components of the system 2000. The use of bus 2047 can be regulated by the controller 2041.

In various embodiments, peripheral devices 2046 can include displays, additional storage memory, or other control devices that may operate in conjunction with the controller 2041 or the memory 2042. In an embodiment, the controller 2041 can be realized as a processor or a group of processors that may operate independently depending on an assigned function. The peripheral devices 2046 can be arranged with a display, as a distributed component on the surface of a well, that can be used with instructions stored in the memory 2042 to implement a user interface to manage the operation of the acoustic tool 2005 and/or components distributed within the system 2000. Such a user interface can be operated in conjunction with the communications unit 2045 and the bus 2047.

Figure 21:
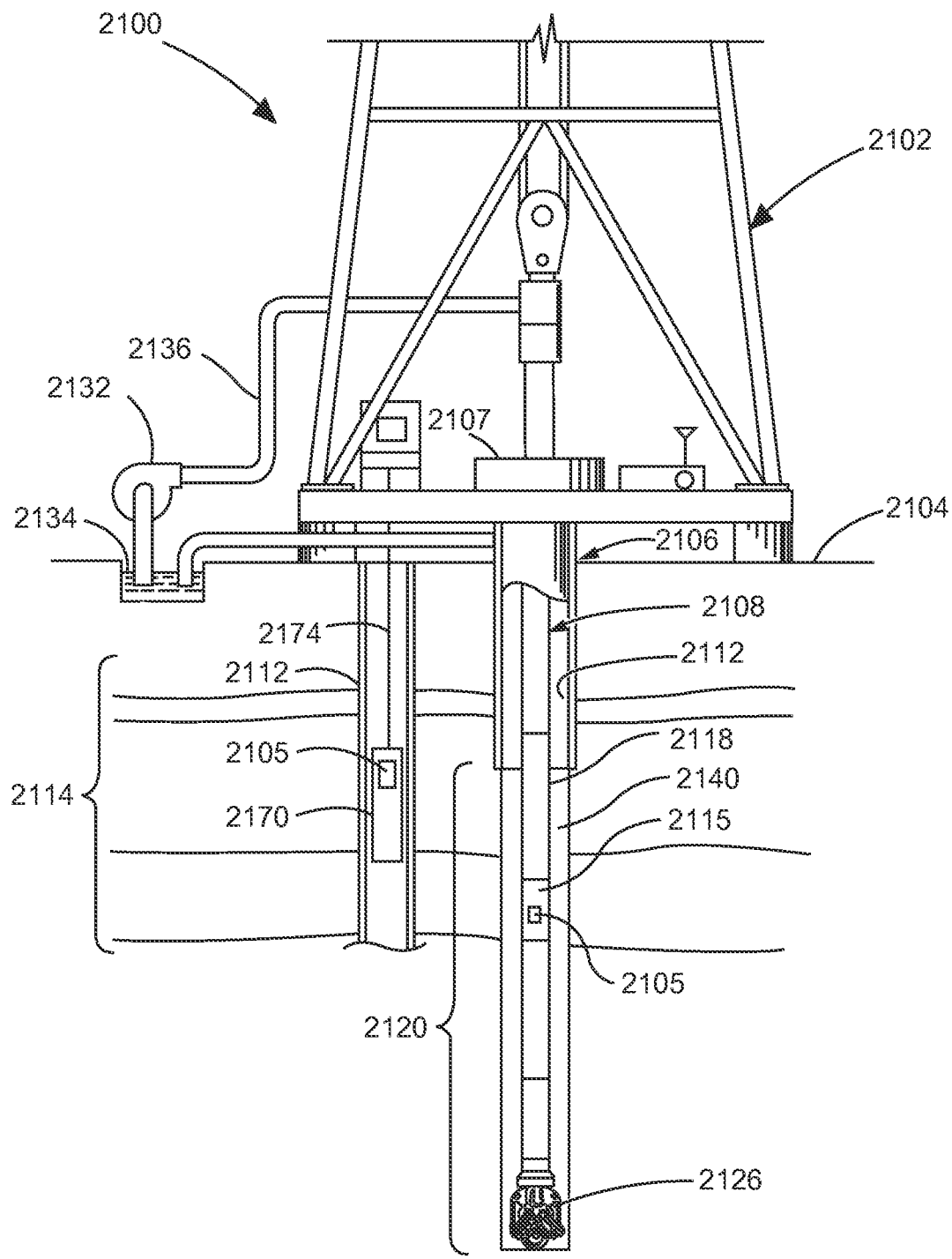
FIG. 21 depicts an embodiment of a system at a drilling site, where the system includes an acoustic measurement tool operable in conjunction with a joint time-frequency processing scheme, in accordance with various embodiments.

FIG. 21 depicts an embodiment of a system 2100 at a drilling site, where the system 2100 includes an acoustic measurement tool 2105 configured with sensors, the sensors including one or more acoustic transmitters to generate an acoustic signal(s) and an acoustic array of receivers at which pressure waves are received in response to the generation of the acoustic signal(s). A control unit and processing unit of the acoustic measurement tool 2105 can be distributed among system 2100 or can be integrated with acoustic measurement tool 2105 providing for control and analysis activities to be conducted downhole. The acoustic measurement tool 2105 can be realized in a similar or identical manner to arrangements and processing discussed herein to make acoustic measurements in a borehole and to process the signals and data from the acoustic measurements to perform joint time-frequency processing of the acoustic signals on data generated from signals acquired at the acoustic measurement tool 2105. The joint time-frequency processing of the received acoustic signals can implement delay calculation from amplitude phase representations of the received acoustic signals.

The system 2100 can include a drilling rig 2102 located at a surface 2104 of a well 2106 and a string of drill pipes, that is, the drill string 2108, connected together so as to form a drilling string that is lowered through a rotary table 2107 into a wellbore or borehole 2112. The drilling rig 2102 can provide support for the drill string 2108. The drill string 2108 can operate to penetrate the rotary table 2107 for drilling the borehole 2112 through subsurface formations 2114. The drill string 2108 can include drill pipe 2118 and a bottom hole assembly 2120 located at the lower portion of the drill pipe 2118.

The bottom hole assembly 2120 can include a drill collar 2115, the tool 2105 attached to the drill collar 2115, and a drill bit 2126. The drill bit 2126 can operate to create the borehole 2112 by penetrating the surface 2104 and the subsurface formations 2114. The acoustic measurement tool 2105 can be structured for an implementation in the borehole 2112 as a MWD system such as a LWD system. The housing containing the acoustic measurement tool 2105 can include electronics to activate one or more transmitters of the acoustic measurement tool 2105 and collect responses from one or more receivers of the acoustic measurement tool 2105. Such electronics can include a processing unit to provide formation analysis, borehole analysis, or combinations thereof to the surface over a standard communication mechanism for operating a well. Alternatively, electronics can include a communications interface to provide signals output by receivers of the acoustic measurement tool 2105 to the surface over a standard communication mechanism for operating a well, where these output signals can be analyzed at a processing unit at the surface to provide formation analysis, borehole analysis, or combinations thereof.

During drilling operations, the drill string 2108 can be rotated by the rotary table 2107. In addition to, or alternatively, the bottom hole assembly 2120 can also be rotated by a motor (e.g., a mud motor) that is located downhole. The drill collars 2115 can be used to add weight to the drill bit 2126. The drill collars 2115 also can stiffen the bottom hole assembly 2120 to allow the bottom hole assembly 2120 to transfer the added weight to the drill bit 2126, and in turn, assist the drill bit 2126 in penetrating the surface 2104 and subsurface formations 2114.

During drilling operations, a mud pump 2132 can pump drilling fluid (sometimes known by those of skill in the art as "drilling mud") from a mud pit 2134 through a hose 2136 into the drill pipe 2118 and down to the drill bit 2126. The drilling fluid can flow out from the drill bit 2126 and be returned to the surface 2104 through an annular area 2140 between the drill pipe 2118 and the sides of the borehole 2112. The drilling fluid may then be returned to the mud pit 2134, where such fluid is filtered. In some embodiments, the drilling fluid can be used to cool the drill bit 2126, as well as to provide lubrication for the drill bit 2126 during drilling operations. Additionally, the drilling fluid may be used to remove subsurface formation 2114 cuttings created by operating the drill bit 2126.

In various embodiments, the acoustic measurement tool 2105 may be included in a tool body 2170 coupled to a logging cable 2174 such as, for example, for wireline applications. The tool body 2170 containing the acoustic measurement tool 2105 can include electronics to activate one or more transmitters of the acoustic measurement tool 2105 and collect responses from one or more receivers of the acoustic measurement tool 2105. Such electronics can include a processing unit to provide formation analysis, borehole analysis, or combinations thereof to the surface over a standard communication mechanism for operating a well. Alternatively, electronics can include a communications interface to provide signals output by receivers of the acoustic measurement tool 2105 to the surface over a standard communication mechanism for operating a well, where these output signals can be analyzed at a processing unit at the surface to provide formation analysis, borehole analysis, or combinations thereof. The logging cable 2174 may be realized as a wireline (multiple power and communication lines), a mono-cable (a single conductor), and/or a slick-line (no conductors for power or communications), or other appropriate structure for use in the borehole 2112.

As discussed herein, in various embodiments, joint time-frequency processing can be applied to acoustic signals. This processing can be based on delay calculation from mode amplitude phases or delay calculation from amplitude phase from using phase coherence. The joint time-frequency processing can combine features of both time-based processing and frequency-based processing. The joint time-frequency processing may produce interference-free dispersion curves as a function of frequency and time, while a time-slowness fan can be applied to these dispersion curves.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
  using a processor and data storage device coupled to an acoustic tool to process signals generated from operating the acoustic tool in a borehole such that the using includes collecting signals from generation of acoustic waves using the acoustic tool;
generating delay values using frequency-based signals, the frequency-based signals correlated to the collected signals, wherein generating the delay values includes
processing the frequency-based signals into a representation that is a series sum of modes, each mode having an amplitude and a pole, and processing the amplitude of a mode such that a delay value is generated; or
processing the frequency-based signals into an amplitude proportional to a sum of products of the frequency-based signals and a corresponding phase factor, the phase factor based on a slowness from a phase coherence of the frequency-based signals, and processing the amplitude such that a delay value is generated; and
evaluating properties associated with the borehole, surrounding formations, or quality of a measurement using the delay values.

2. The method of claim 1, wherein generating delay values includes
processing the frequency-based signals into a representation that is a series sum of modes, each mode having an amplitude and a pole; and
processing the amplitude of a mode such that a delay value is generated.

3. The method of claim 1, wherein the method includes converting pressure at receivers of the acoustic tool to voltages expanded into a series sum of modes given by $$V_i(f) = \sum_{n=1}^{N_m} A_n (Z_n)^{i-i_{ref}}$$

where f is frequency, $N_m$ is a total number of modes in the expansion, $A_n$ is a complex valued amplitude of mode n, $Z_n$ is a complex valued pole of mode n, and $i_{ref}$ is a reference index, and delay for mode n generated according to $$d_n = -\frac{d}{df}\left(\frac{\text{angle}(A_n)}{2\pi}\right).$$

4. The method of claim 1, wherein generating delay values includes
processing the frequency-based signals into an amplitude proportional to a sum of products of the frequency-based signals and a corresponding phase factor, the phase factor based on a slowness from a phase coherence of the frequency-based signals; and
processing the amplitude such that a delay value is generated.

5. The method of claim 1, wherein the method includes collecting voltages from receivers of the acoustic tool and generating delay according to $$\text{delay} = -\frac{d}{df}\left(\frac{\text{angle}(A)}{2\pi}\right)$$

from $$A = \frac{1}{N_r}\sum_{i=1}^{N_r} V_i(f) e^{j2\pi f s_{PC}(f)(z_i - z_{ref})}$$

with A being amplitude where j is the imaginary number, $N_r$ is a total number of receivers, $z_i$ is axial position of an i'th receiver, $z_{ref}$ is a reference position, and $s_{pc}(f)$ is slowness from a phase coherence as a function of frequency, f.

6. The method of claim 1, wherein processing the amplitude includes determining a phase delay of the mode or determining a group delay of the mode.

7. The method of claim 6, wherein determining the phase delay includes determining $$-\frac{\text{angle}(A_n)}{2\pi f}$$

and determining the group delay includes determining $$-\frac{d}{df}\left(\frac{\text{angle}(A_n)}{2\pi}\right),$$

$A_n$ being a complex-valued amplitude of a mode n, f being frequency.

8. The method of claim 1, wherein evaluating properties associated with the borehole or surrounding formations includes pairing the delay values with frequency, pairing the delay values with slowness values, or pairing the delay values with frequency and pairing the delay values with slowness values.

9. The method of claim 1, wherein the method includes using the calculated delay values to determine a window in time for further processing in time.

10. The method of claim 9, wherein the method includes determining delay values multiple times with each determination having a different time window to evaluate separate wave packets with a same frequency and slowness arriving at different times.

11. The method of claim 1, wherein collecting signals includes acquiring pressure at receivers of the acoustic tool, the pressure generated by a transmitter of the acoustic tool at different depths of the borehole.

12. The method of claim 11, wherein acquiring pressure at receivers of the acoustic tool includes acquiring pressure at a plurality of stations of the tool, each station having a plurality of receivers around the acoustic tool.

13. The method of claim 1, wherein collecting signals from generation of acoustic waves using the acoustic tool includes generating acoustic waves at a plurality of frequencies from the acoustic tool.

14. A method comprising:
using a processor and data storage device coupled to an acoustic tool to process signals generated from operating the acoustic tool in a borehole such that the using includes
collecting signals from generation of acoustic waves using the acoustic tool;
generating delay values using frequency-based signals, the frequency-based signals correlated to the collected signals;

evaluating properties associated with the borehole, surrounding formations, or quality of measurement using the delay values; and generating a fan from slowness values, the delay values, and associated frequency values to generate filtered points.

15. The method of claim 14, wherein generating filtered points includes applying a fan on a point, the point given by frequency and mode (f, n), according to a three-dimension coordinate system of frequency, slowness, delay of a mode, (f, $s_n$, $delay_n$), by discarding the solutions that lie out of the fan as follows $$\text{action on point } (f, n) = \begin{cases} \text{keep,} & \text{if fan}(f, s_n, delay_n) = 1 \\ \text{discard,} & \text{otherwise.} \end{cases}$$

16. The method of claim 14, wherein generating filtered points includes applying a fan based on the frequency values and the delay values, applying a fan based on the delay values and the slowness values, and applying a fan based on the frequency values and the slowness values.

17. A method comprising:
using a processor and data storage device coupled to an acoustic tool to process signals generated from operating the acoustic tool in a borehole such that the using includes
collecting signals from generation of acoustic waves using the acoustic tool;
generating delay values using frequency-based signals, the frequency-based signals correlated to the collected signals;
evaluating properties associated with the borehole, surrounding formations, or quality of a measurement using the delay values;
discretizing a range of frequency, mud, borehole, and formation parameters to form a grid of points;
performing a modeling on each point to generate modeled received acoustic signals;
processing the received acoustic signals forming points ($f_i$, $s_i$, $d_i$) corresponding to frequency, slowness, and delay of each point, respectively; and
interpolating the formed points to yield a multi-dimensional volume as a fan.

18. The method of claim 17, wherein the method includes forming a frequency-slowness-delay fan ($fan_{FSD}$) with respect to the grid of points and data according to $$fan_{FSD} = \begin{cases} 1, & \exists i, |f_i^l - f_i^d| < \Delta f, |s_i^l - s_i^d| < \Delta s \text{ and } |d_i^l - d_i^d| < \Delta d, \\ 0, & \text{otherwise} \end{cases}, \text{ where}$$

$\Delta f$: frequency threshold for comparison
$\Delta s$: slowness threshold for comparison
$\Delta d$: delay threshold for comparison
$f_i^l$: frequency of i'th point in the gird
$s_i^l$: slowness of i'th point in the gird
$d_i^l$: delay of i'th point in the gird
$f_i^d$: frequency of i'th point in the data
$s_i^d$: slowness of i'th point in the data
$d_i^d$: delay of i'th point in the data.

19. A machine-readable storage device having instructions stored thereon, which, when performed by a machine, cause the machine to perform operations, the operations comprising:

using a processor and data storage device coupled to an acoustic tool to process signals generated from operating the acoustic tool in a borehole such that the using includes
collecting signals from generation of acoustic waves using the acoustic tool;
generating delay values using frequency-based signals, the frequency-based signals correlated to the collected signals, wherein generating delay values includes
processing the frequency-based signals into a representation that is a series sum of modes, each mode having an amplitude and a pole, and processing the amplitude of a mode such that a delay value is generated; or
processing the frequency-based signals into an amplitude proportional to a sum of products of the frequency-based signals and a corresponding phase factor, the phase factor based on a slowness from a phase coherence of the frequency-based signals, and processing the amplitude such that a delay value is generated; and
evaluating properties associated with the borehole, surrounding formations, or quality of a measurement using the delay values.

20. A system comprising:
an acoustic tool having a transmitter and an array of receivers;
a control unit operable to manage generation of acoustic signals from the transmitter and to manage collection of received signals at the receivers; and
a processing unit, wherein the acoustic tool, the control unit, and the processing unit are configured to process signals generated from operation of the acoustic tool in a borehole, collect signals from the generation of acoustic waves from use of the acoustic tool, generate delay values using frequency-based signals, the frequency-based signals correlated to the collected signals, and evaluate properties associated with the borehole, surrounding formations, or quality of a measurement from use of the delay values, wherein generation of the delay values includes
processing the frequency-based signals into a representation that is a series sum of modes, each mode having an amplitude and a pole, and processing the amplitude of a mode such that a delay value is generated; or
processing the frequency-based signals into an amplitude proportional to a sum of products of the frequency-based signals and a corresponding phase factor, the phase factor based on a slowness from a phase coherence of the frequency-based signals and processing the amplitude such that a delay a value is generated.

21. The system of claim 20, wherein the acoustic tool, the control unit, and the processing unit are configured to convert pressure at the receivers of the acoustic tool to voltages expanded into a series sum of modes given by $$V_i(f) = \sum_{n=1}^{N_m} A_n (Z_n)^{i-i_{ref}}$$

where f is frequency, $N_m$ is a total number of modes in the expansion, $A_n$ is a complex valued amplitude of mode n, $Z_n$ is a complex valued pole of mode n, and $i_{ref}$ is a reference index, and delay for mode n generated according to $$d_n = -\frac{d}{df}\left(\frac{\text{angle}(A_n)}{2\pi}\right).$$

22. The system of claim 20, wherein the acoustic tool, the control unit, and the processing unit are configured to collect voltages from the receivers of the acoustic tool and to generate the delay values according to delay $$= -\frac{d}{df}\left(\frac{\text{angle}(A)}{2\pi}\right)$$

from $$A = \frac{1}{N_r}\sum_{i=1}^{N_r} V_i(f)e^{j2\pi f s_{PC}(f)(z_i - z_{ref})}$$

with A being amplitude where j is the imaginary number, $N_r$ is a total number of receivers, $z_i$ is axial position of an i'th receiver, $z_{ref}$ is a reference position, and $s_{pc}(f)$ is slowness from a phase coherence as a function of frequency, f.

23. The system of claim 20, wherein the acoustic tool, the control unit, and the processing unit are configured to determine a phase delay by determination of $$-\frac{\text{angle}(A_n)}{2\pi f}$$

and to determine a group delay by determination of $$-\frac{d}{df}\left(\frac{\text{angle}(A_n)}{2\pi}\right),$$

$A_n$ being a complex-valued amplitude of a mode n, f being frequency and a mode being one of a series sum of modes of a representation of the frequency-based signals.

24. A system comprising:
an acoustic tool having a transmitter and an array of receivers;
a control unit operable to manage generation of acoustic signals from the transmitter and to manage collection of received signals at the receivers; and
processing unit, wherein the acoustic tool, the control unit, and the processing unit are configured to process signals generated from operation of the acoustic tool in a borehole, collect signals from the generation of acoustic waves from use of the acoustic tool, generate delay values using frequency-based signals, the frequency-based signals correlated to the collected signals, and evaluate properties associated with the borehole, surrounding formations, or quality of a measurement from use of the delay values, wherein the acoustic tool, the control unit, and the processing unit are configured to generate a fan from slowness values, the delay values, and associated frequency values to generate filtered points.

25. A system comprising:
an acoustic tool having a transmitter and an array of receivers;
a control unit operable to manage generation of acoustic signals from the transmitter and to manage collection of received signals at the receivers; and
a processing unit, wherein the acoustic tool, the control unit, and the processing unit are configured to process signals generated from operation of the acoustic tool in a borehole, collect signals from the generation of acoustic waves from use of the acoustic tool, generate delay values using frequency-based signals, the frequency-based signals correlated to the collected signals, and evaluate properties associated with the borehole, surrounding formations, or quality of a measurement from use of the delay values, wherein the acoustic tool, the control unit, and the processing unit are configured to:
discretize a range of frequency, mud, borehole, and formation parameters to form a grid of points;
perform a modeling on each point to generate modeled received acoustic signals;
process the received acoustic signals forming points ($f_i$, $s_i$, $d_i$) corresponding to frequency, slowness, and delay of each point, respectively; and
interpolate the formed points to yield a multi-dimensional volume as a fan.

* * * * *